United States Patent
Tozzi et al.

(10) Patent No.: US 9,004,042 B2
(45) Date of Patent: Apr. 14, 2015

(54) METHOD AND APPARATUS FOR ACHIEVING HIGH POWER FLAME JETS WHILE REDUCING QUENCHING AND AUTOIGNITION IN PRECHAMBER SPARK PLUGS FOR GAS ENGINES

(75) Inventors: Luigi P Tozzi, Fort Collins, CO (US);
Maria-Emmanuella Sotiropoulou, Fort Collins, CO (US)

(73) Assignee: Prometheus Applied Technologies, LLC, Fort Collins, CO (US)

( * ) Notice: Subject to any disclaimer, the term of this patent is extended or adjusted under 35 U.S.C. 154(b) by 313 days.

(21) Appl. No.: 13/602,148

(22) Filed: Sep. 1, 2012

(65) Prior Publication Data

US 2013/0055986 A1 Mar. 7, 2013

Related U.S. Application Data

(60) Provisional application No. 61/573,290, filed on Sep. 3, 2011.

(51) Int. Cl.
*F02B 19/00* (2006.01)
*F02P 9/00* (2006.01)
(Continued)

(52) U.S. Cl.
CPC ............ *F02P 9/00* (2013.01); *F02B 19/1061* (2013.01); *F02B 19/12* (2013.01); *F02P 13/00* (2013.01); *H01T 13/54* (2013.01)

(58) Field of Classification Search
CPC ..... H01T 13/54; F02B 19/12; F02B 19/1061; F02M 57/06
USPC .................... 123/260, 266, 287, 297, 169 EL
See application file for complete search history.

(56) References Cited

U.S. PATENT DOCUMENTS

| | | |
|---|---|---|
| 1,365,143 A | 1/1921 | Anderson |
| 2,127,512 A | 8/1938 | Harper |

(Continued)

FOREIGN PATENT DOCUMENTS

| | | |
|---|---|---|
| DE | 10144976 A1 | 4/2003 |
| DE | 102010004851 A1 | 6/2011 |

(Continued)

OTHER PUBLICATIONS

Luigi Tozzi, Emmanuella Sotiropoulou, Jessica Harral, Daniel Miller-Lionberg, Kelly Benson, Passive Prechamber Spark Plugs: Then and Now, 7th Dessauer Gasmotoren Conference, 2011/pp. 157-169. 7 Pages.

(Continued)

*Primary Examiner* — Hai Huynh
(74) *Attorney, Agent, or Firm* — Barcelo, Harrison & Walker LLP

(57) ABSTRACT

A prechamber spark plug may have a prechamber having a pre-determined aspect ratio and hole pattern to achieve particular combustion performance characteristics. The aspect ratio and hole pattern may induce a rotational flow of fuel-air in-filling streams inside the prechamber volume. The rotational flow of the fuel-air mixture may include both radial flow and axial flow characteristics based on the aspect ratio and hole pattern. Axial flow characteristics can include a first axial direction proximate the periphery of the rotational flow and a counter second axial direction approaching the center of the rotational flow. The radial and axial flow characteristics may further include radial air-fuel ratio stratification and/or axial air-fuel ratio stratification. The rotational flow, the radial flow and the axial flow may be adjusted by alteration of the aspect ratio and hole pattern to achieve particular combustion performance characteristics in relation to a wide variety of spark gap geometries.

68 Claims, 16 Drawing Sheets

(51) Int. Cl.
*F02P 13/00* (2006.01)
*H01T 13/54* (2006.01)
*F02B 19/10* (2006.01)
*F02B 19/12* (2006.01)

(56) References Cited

U.S. PATENT DOCUMENTS

| | | | |
|---|---|---|---|
| 4,416,228 A * | 11/1983 | Benedikt et al. | 123/268 |
| 4,442,807 A * | 4/1984 | Latsch et al. | 123/263 |
| 4,471,732 A | 9/1984 | Tozzi | |
| 4,730,582 A | 3/1988 | Lindsay | |
| 4,875,939 A | 10/1989 | Miyakawa et al. | |
| 4,930,473 A | 6/1990 | Dietrich | |
| 7,243,634 B2 | 7/2007 | Tourteaux et al. | |
| 7,659,655 B2 | 2/2010 | Tozzi et al. | |
| 8,584,648 B2 * | 11/2013 | Chiera et al. | 123/266 |
| 2002/0134345 A1 | 9/2002 | Adams | |
| 2004/0100179 A1 | 5/2004 | Boley et al. | |
| 2005/0211217 A1 | 9/2005 | Boley et al. | |
| 2011/0148274 A1 | 6/2011 | Ernst et al. | |
| 2011/0175514 A1 | 7/2011 | Kameda | |
| 2014/0060479 A1 * | 3/2014 | Tozzi et al. | 123/260 |

FOREIGN PATENT DOCUMENTS

| | | |
|---|---|---|
| DE | 102010022564 A1 | 12/2011 |
| JP | S57173524 A | 10/1982 |
| JP | 2001227344 A | 8/2001 |
| JP | 2006144648 A | 6/2006 |
| JP | 2007113536 A | 5/2007 |
| JP | 2009270539 A | 11/2009 |

OTHER PUBLICATIONS

Luigi Tozzi and Eli K. Dabora, Plasma Jet Ignition in a Lean-Burn CFR Engine, Nineteenth Symposium (International) on Combustion/The Combustion Institute, 1982/pp. 1467-1474. 8 Pages.

International Search Report and the Written Opinion of the International Searching Authority with mail date of Nov. 23, 2012, for International Application No. PCT/US12/53568 filed on Sep. 1, 2012. 14 Pages.

Office Action of Japanese Patent Application No. 2014-528681 mailed on Jan. 19, 2015. 9 pages.

* cited by examiner

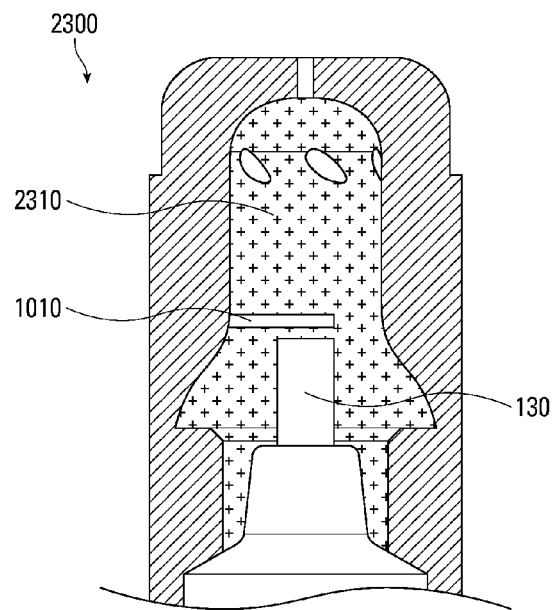
Fig. 23
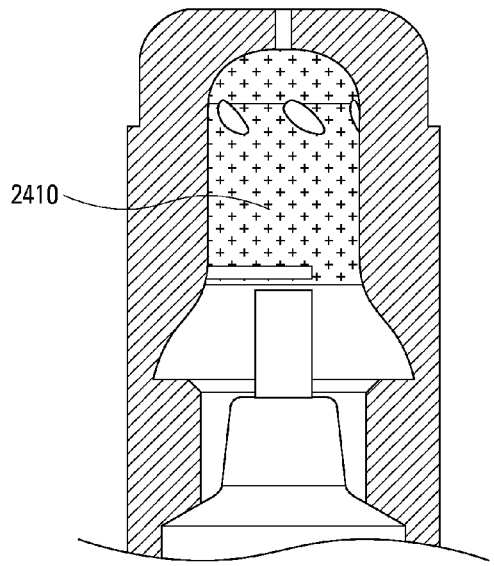 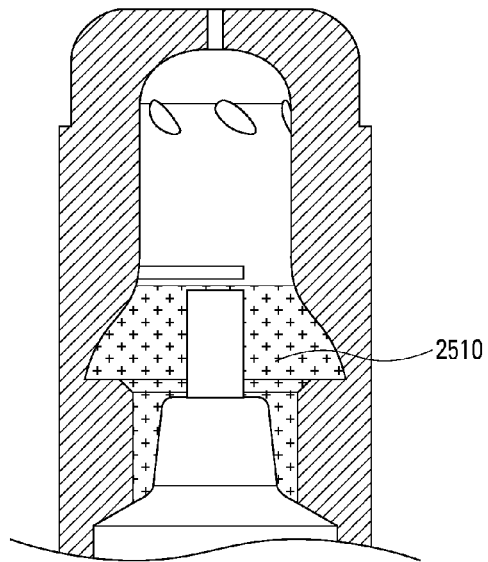
Fig. 24  Fig. 25

METHOD AND APPARATUS FOR ACHIEVING HIGH POWER FLAME JETS WHILE REDUCING QUENCHING AND AUTOIGNITION IN PRECHAMBER SPARK PLUGS FOR GAS ENGINES

I. CROSS-REFERENCE TO RELATED APPLICATIONS

This application claims priority to U.S. Patent Application No. 61/573,290, entitled "Method and apparatus for achieving high power flame jets while reducing quenching and autoignition in prechamber spark plugs for gas engines," and filed on Sep. 3, 2011. This application is also related to International Application Number PCT/US2011/002012, entitled "Prechamber Ignition System," and filed on Dec. 30, 2011, which claims priority to U.S. Patent Application No. 61/460,337, entitled "High efficiency ricochet effect passive chamber spark plug," and filed on Dec. 31, 2010. The entirety of each of the foregoing patent applications is incorporated by reference herein to the extent consistent with the present disclosure.

II. FIELD OF THE INVENTION

The disclosure generally relates to prechamber geometry aspect ratios and hole patterns that can be adjusted in relation to a spark gap geometry to achieve a rotational flow of fuel-air in-filling streams inside the prechamber volume of a prechamber spark plug to provide a radial flow and an axial flow, and more particularly to an axial flow exhibiting a first axial direction proximate the periphery of the rotational flow and a counter second axial direction approaching the center of the rotational flow, which can exhibit both radial and axial air-fuel ratio stratification to afford particular combustion performance characteristics.

III. BACKGROUND OF THE INVENTION

Conventional prechamber spark plugs for gas engines may simply aim at achieving combustion in a prechamber with no particular regards to the fuel distribution, uniformity of flow fields and mixing of residual gases inside of the prechamber of the spark plug. This may result in undesirable ignition delay, increased propensity to flame quenching, and autoignition; furthermore, the emerging flame jets may be weak, resulting in poor combustion performance of the fuel-air mixture in the main combustion chamber of the gas engine.

Engines operating on gaseous fuels, such as natural gas, may be supplied with a lean fuel mixture having a relatively high ratio of oxidizer to fuel. Conventional prechamber spark plugs may be used to enhance the lean flammability limits in lean burn engines. As one example, U.S. Pat. No. 7,922,551 describes a prechamber spark plug which reduces electrode erosion by spreading the discharge energy over a wider surface area via a swirling effect created by periphery holes in an end cap.

However, in general there remain a number of unresolved disadvantages with the use of conventional prechamber spark plugs in lean burn engines and specifically as described in U.S. Pat. No. 7,922,551, as follows. First, conventional prechamber spark plugs may have pre-combustion chambers that do not adequately concentrate fuel at the spark gap region of the spark plug. In such cases, the flow field forces within the spark gap region may be chaotic resulting in zones with either very low flow fields or very high flow fields. This can result in either very short ignition delay as the flame kernel is grown very rapidly by the high flow field forces or it can result in flame kernel quenching as there are no flow field forces to move the flame kernel away from the quenching surfaces. Second, conventional prechamber spark plugs may promote flame kernel development in proximity to flame quenching surfaces or promote flame growth toward flame quenching surfaces. Third, the configuration of the prechamber may not mix in-filling streams with residual gases to sufficiently lower the temperature inside of the prechamber or the internal surface of the prechamber, which may result in autoignition of the fuel-oxidizer mixture. Fourth, the configuration of the prechamber may not result in sufficiently fast burn rates with lean fuel mixtures resulting in deployment of flame jets into the main combustion chamber, which by comparison with faster burn rates have lesser momentum.

There is a need to address the foregoing deficiencies in the art.

IV. SUMMARY OF THE INVENTION

In certain embodiments, a pre-combustion chamber is disclosed including: a prechamber including an external surface and an internal surface enclosing a prechamber volume; one or more holes communicating between the external surface and the internal surface for introducing a fuel-air mixture into the prechamber volume, each of the holes including a hole axis that defines an index angle and a rotational offset for creating a spiral flow pattern of the fuel-air mixture in the prechamber volume; a primary electrode disposed within the prechamber volume; one or more ground electrodes disposed within the prechamber volume and offset from the primary electrode to form one or more electrode gaps. The spiral flow pattern of the fuel-air mixture may include a center and a periphery and may include a higher velocity proximate the periphery than proximate the center. The spiral flow pattern may include a center and a periphery and may include a higher velocity proximate the center than proximate the periphery. The hole axis may further define a penetration angle for creating an axial flow pattern of the fuel-air mixture in the prechamber volume. The axial flow pattern may include a substantially uniform velocity flow field acting substantially in an axial direction proximate the electrodes to cause a flame kernel to develop substantially in a forward direction toward one or more of the one or more holes. The axial flow pattern may include a first axial flow pattern proximate the periphery of the prechamber and a second axial flow pattern proximate the center of the prechamber. The second axial flow pattern may be substantially counter to the first axial flow pattern. The index angle of a first hole of the one or more holes may be between about 0 degrees and about 120 degrees. The rotational offset of each of the one or more holes may be between about 0 mm and about 10 mm. The hole axis further may define a penetration angle for creating a forward flow of the fuel-air mixture in the prechamber volume. The penetration angle of each of the one or more holes may be between about 10 degrees and about 75 degrees. The one or more holes may include one or more inner holes and one or more outer holes. The one or more inner holes may be located closer to a central longitudinal axis of the prechamber than the one or more outer holes. An index angle of a first inner hole of the one or more inner holes may be between about 0 degrees and about 120 degrees. An index angle of a first outer hole of the one or more outer holes may be between about 0 degrees and about 120 degrees. A rotational offset of each of the one or more inner holes may be between about 0 mm and about 10 mm. A rotational offset of each of the one or more outer holes may be between about 0 mm and about 10 mm. The hole axis further may define a penetration angle for creating a forward flow of the fuel-air mixture in the prechamber volume. A penetration angle of each of the one or more inner holes may be between about 10 degrees and about 75 degrees. A penetration angle of each of the one or more outer holes may be between about 0 degrees and about 90 degrees. A pattern radius of each of the one or more inner holes may be between about 2 mm and about 10 mm. A pattern radius of each of the one or more outer holes may be between about 3 mm and about 5 mm. The prechamber volume may include a top portion above a top surface of the primary electrode and a bottom portion below the top surface of the primary electrode. The bottom portion may be configured to allow mixing and cooling of residual gases to prevent autoignition before introduction of a spark. The bottom portion may have a volume from about 250 mm$^3$ to about 3000 mm$^3$. The bottom portion may have an aspect ratio from about 0.5 to about 3. The top portion may be configured to allow the retention of a sufficient ignitable fuel-air mixture to generate one or more flame jets out of one or more of the one or more holes upon introduction of a spark. The top portion may have a volume from about 250 mm$^3$ to about 3000 mm$^3$. The top portion may have an aspect ratio from about 0.5 to about 3. The top portion may have an aspect ratio greater than 1 and the bottom portion may have an aspect ratio of approximately 1. The one or more ground electrodes may be offset radially from the primary electrode. The one or more ground electrodes may be offset axially from the primary electrode. The concentration of fuel proximate a periphery of the prechamber volume may be higher than the average fuel concentration in the fuel-air mixture. The concentration of fuel may be higher proximate the one or more holes than the average fuel concentration in the fuel-air mixture. The concentration of fuel proximate the one or more electrode gaps may be lower than the average fuel concentration in the fuel-air mixture to increase ignition delay.

In certain embodiments, a method of generating high momentum flame jets is disclosed, including: providing a prechamber including: an external surface and an internal surface enclosing a prechamber volume; one or more holes communicating between the external surface and the internal surface for introducing a fuel-air mixture into the prechamber volume, each of the one or more holes including an hole axis that defines an index angle and a rotational offset for creating a spiral flow pattern of the fuel-air mixture in the prechamber volume; a primary electrode disposed within the prechamber volume; one or more ground electrodes disposed within the prechamber volume and offset from the primary electrode to form one or more electrode gaps; introducing one or more fuel-air in-filling streams to the prechamber volume through the one or more holes, wherein the one or more fuel-air in-filling streams create a spiral flow pattern about a central longitudinal axis of the prechamber; and introducing a spark across at least one of the one or more electrodes gaps to ignite the fuel-air mixture. The spiral flow pattern may include a center and a periphery and may include a higher velocity proximate the periphery than proximate the center. The spiral flow pattern may include a center and a periphery and may include a higher velocity proximate the center than proximate the periphery. The one or more fuel-air in-filling streams create an axial flow pattern in the prechamber. The axial flow pattern may include a substantially uniform velocity flow field acting substantially in an axial direction proximate the electrodes to cause a flame kernel to develop substantially in a forward direction toward one or more of the one or more holes. The axial flow pattern may include a first axial flow pattern proximate a periphery of the prechamber and a second axial flow pattern proximate a center of the prechamber. The second axial flow pattern may be substantially counter to the first axial flow pattern. The index angle of a first hole of the one or more holes may be between about 0 degrees and about 120 degrees. The rotational offset of each of the one or more holes may be between about 0 mm and about 10 mm. The hole axis further may define a penetration angle for creating a forward flow of the fuel-air mixture in the prechamber volume. The penetration angle of each of the one or more holes may be between about 10 degrees and about 75 degrees. The one or more holes may include one or more inner holes and one or more outer holes. The one or more inner holes may be located closer to the central longitudinal axis of the prechamber than the one or more outer holes. An index angle of a first inner hole of the one or more inner holes may be between about 0 degrees and about 120 degrees. An index angle of a first outer hole of the one or more outer holes may be between about 0 degrees and about 120 degrees. A rotational offset of each of the one or more inner holes may be between about 0 mm and about 10 mm. A rotational offset of each of the one or more outer holes may be between about 0 mm and about 10 mm. The hole axis further may define a penetration angle for creating a forward flow of the fuel-air mixture in the prechamber volume. A penetration angle of each of the one or more inner holes may be between about 10 degrees and about 75 degrees. A penetration angle of each of the one or more outer holes may be between about 0 degrees and about 90 degrees. A pattern radius of each of the one or more inner holes may be between about 2 mm and about 10 mm. A pattern radius of each of the one or more outer holes may be between about 3 mm and about 5 mm. The prechamber volume may include a top portion above a top surface of the primary electrode and a bottom portion below the top surface of the primary electrode. The bottom portion may be configured to allow mixing and cooling of residual gases to prevent autoignition before introduction of the spark. The bottom portion may have a volume from about 250 mm$^3$ to about 3000 mm$^3$. The bottom portion may have an aspect ratio from about 0.5 to about 3. The top portion may be configured to allow the retention of a sufficient ignitable fuel-air mixture to generate one or more flame jets out of one or more of the holes upon introduction of the spark. The top portion may have a volume from about 250 mm$^3$ to about 3000 mm$^3$. The top portion may have an aspect ratio from about 0.5 to about 3. The top portion may have an aspect ratio greater than 1 and the bottom portion may have an aspect ratio of approximately 1. The one or more ground electrodes may be offset radially from the primary electrode. The one or more ground electrodes may be offset axially from the primary electrode. The concentration of fuel proximate a periphery of the prechamber volume may be higher than the average fuel concentration in the fuel-air mixture. The concentration of fuel may be higher proximate the one or more holes than the average fuel concentration in the fuel-air mixture. The concentration of fuel proximate the one or more electrode gaps may be lower than the average fuel concentration in the fuel-air mixture to increase ignition delay.

V. BRIEF DESCRIPTION OF THE DRAWINGS

FIGS. 23-25 depict various portions of a prechamber with a transverse electrode in accordance with certain embodiments.

VI. DETAILED DESCRIPTION OF THE INVENTION

Figure 1:
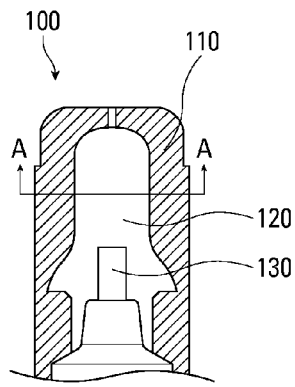
FIG. 1 depicts a prechamber in accordance with certain embodiments.

In certain embodiments, a prechamber spark plug is structured to provide controllable ignition delay or start of combustion, with reduced flame quenching and autoignition and with coincident high power flame jets and fast combustion of fuel-air mixtures in the main combustion chamber as compared to conventional prechamber spark plugs.

In certain embodiments, a pre-combustion chamber may be capable of generating high momentum flame jets, emerging from the pre-combustion chamber, while maintaining a large safety margin on the occurrence of misfire and pre-ignition (e.g., autoignition of the mixture occurring prior to a spark event).

In certain embodiments, a prechamber spark plug is disclosed having a prechamber geometry aspect ratio and hole pattern that can be varied in pre-determined relation to spark gap geometry to achieve particular combustion performance characteristics.

Certain embodiments provide a method of pre-determining prechamber geometry aspect ratio and hole pattern which can be varied in relation to spark gap geometry to achieve particular combustion performance characteristics.

Certain embodiments provide a prechamber having a top prechamber portion having a geometry aspect ratio that has a length-diameter ratio substantially greater than 1.0 and may further provide a bottom prechamber portion having a geometry aspect ratio that has a length-diameter ratio of approximately 1.0.

Certain embodiments provide prechamber geometry aspect ratios and hole patterns which assist in generating a rotational flow of fuel-air in-filling stream inside the prechamber volume, the rotational flow having a radial flow and an axial flow which can provide a first axial direction proximate the periphery of the rotational flow and a second counter axial flow approaching the center of the rotational flow and which can further afford a flow field having a radial and axial air-fuel ratio stratification.

Certain embodiments provide a rotational flow of fuel-air mixture about the central longitudinal axis of the prechamber having a higher velocity proximate the internal surface of the prechamber and lesser velocity approaching the central longitudinal axis of the prechamber.

Certain embodiments provide a rotational pattern of fuel-air mixture inside of the prechamber with a richer fuel-air mixture proximate the internal surface of the prechamber and a leaner fuel-air mixture approaching the central longitudinal axis of the prechamber.

A prechamber spark plug may have a prechamber having a pre-determined aspect ratio and hole pattern to achieve particular combustion performance characteristics. The aspect ratio and hole pattern may induce a rotational flow of fuel-air in-filling streams inside the prechamber volume. The rotational flow of the fuel-air mixture may include both radial flow and axial flow characteristics based on the aspect ratio and hole pattern. Axial flow characteristics can include a first axial direction proximate the periphery of the rotational flow and a counter second axial direction approaching the center of the rotational flow. The radial and axial flow characteristics may further include radial air-fuel ratio stratification and/or axial air-fuel ratio stratification. The rotational flow, the radial flow and the axial flow may be adjusted by alteration of the aspect ratio and hole pattern to achieve particular combustion performance characteristics in relation to a wide variety of spark gap geometries.

The figures and descriptions provide particular illustrative examples of prechamber geometry aspect ratios and hole patterns which achieve in relation to particular spark gap geometries higher power flame jets and fast combustion of fuel-air mixtures in the main combustion chamber as compared to conventional prechamber spark plugs. However, the illustrative examples are not intended to be limiting in regard to the numerous and varied spark gap geometries which can be accommodated by corresponding numerous and varied pre-determined prechamber geometry aspect ratios and hole patterns and/or achieve rotational flow of fuel-air in-filling streams to provide the radial and axial flow characteristics herein described, including direction and magnitude of velocity radial and axial flow and stratification of air-fuel ratios within the prechamber volume and at the spark gap, or the like.

Figure 2:
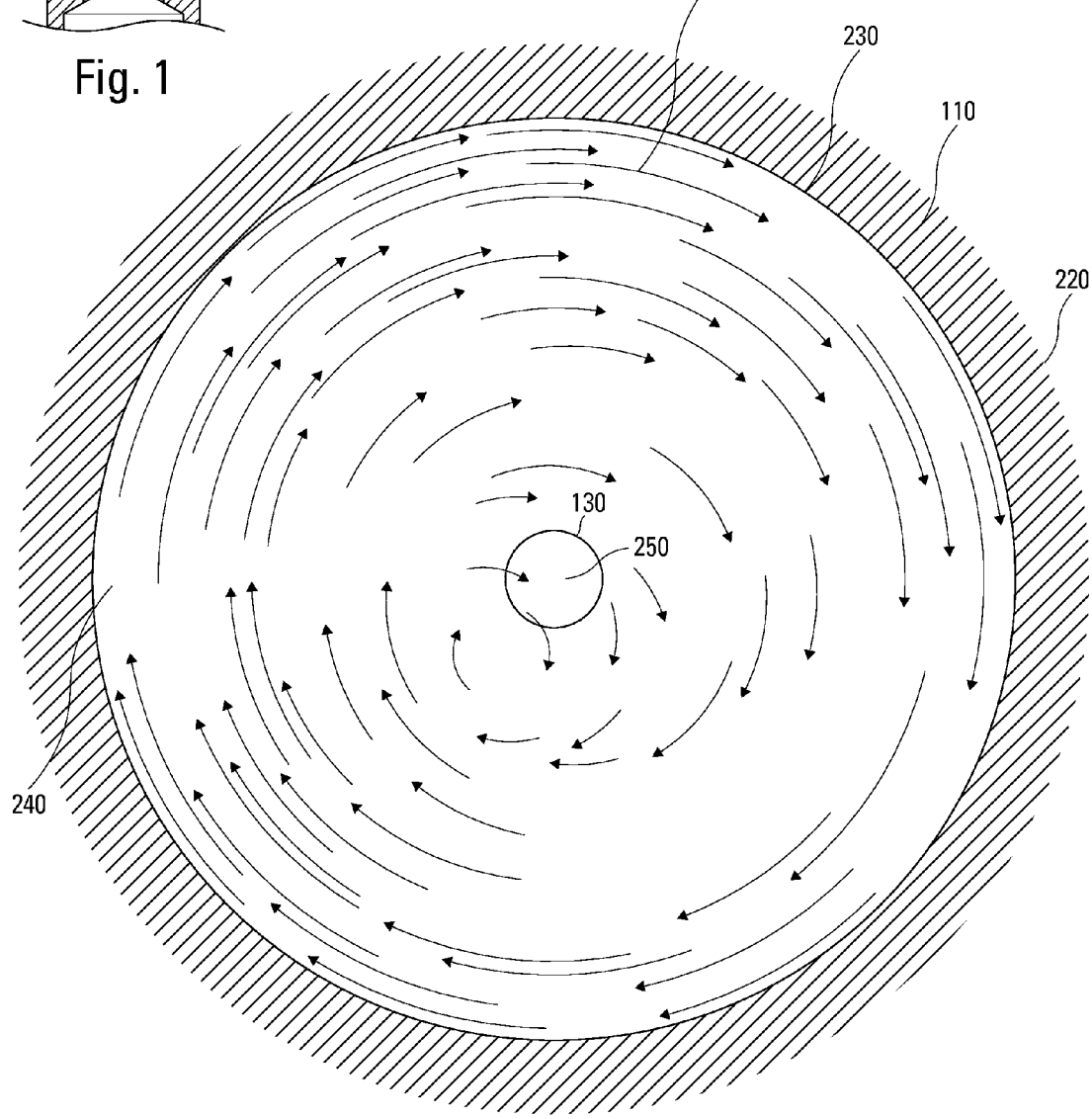
FIG. 2 is depicts a cross-sectional view along cross-section A-A of FIG. 1 in accordance with certain embodiments.

In certain embodiments, FIG. 1 depicts a prechamber 100 with a prechamber wall 110 enclosing a prechamber volume 120. The prechamber spark plug may include an electrode 130 that may be located within the prechamber volume 120. In certain embodiments, FIG. 2 depicts a cross-sectional view 200 along cross-section A-A of FIG. 1 including a rotational flow pattern 210 within the prechamber volume 120. The velocity of the rotational flow at any given point in prechamber volume 120 is shown by the direction and length of the arrows of rotational flow pattern 210. The velocity flow field within prechamber volume 120 may be substantially rotational in the transverse plane (e.g., along cross-section A-A of FIG. 1). In certain embodiments, a prechamber spark plug may provide a prechamber 100 having a prechamber wall 110. The prechamber wall 110 may include an external surface 220 and an internal surface 230, which encloses a prechamber volume 120 in which an electrode 130 may be disposed.

Figure 3:
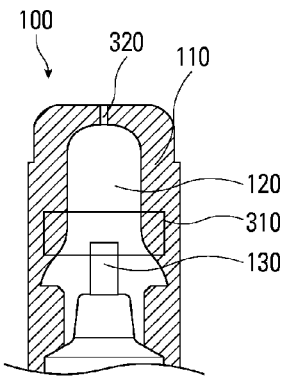
FIG. 3 depicts a prechamber in accordance with certain embodiments.
Figure 4:
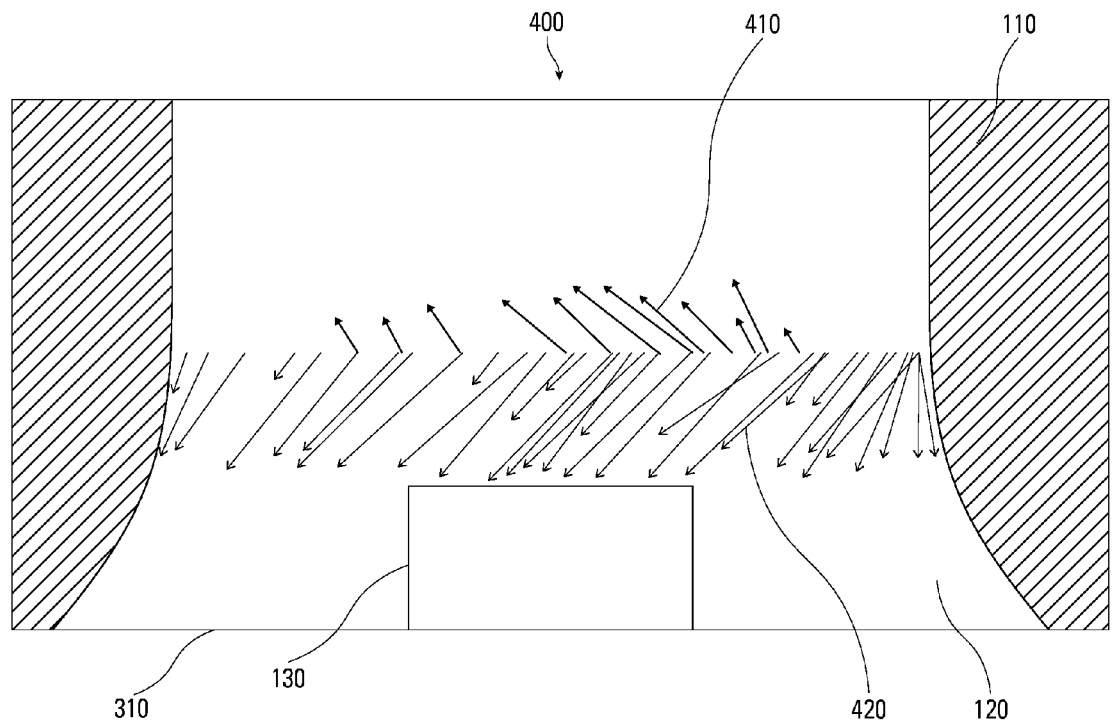
FIG. 4 depicts an expanded view of section 310 of FIG. 3 in accordance with certain embodiments.
Figure 5:
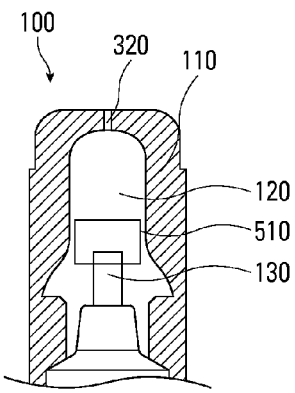
FIG. 5 depicts a prechamber in accordance with certain embodiments.
Figure 6:
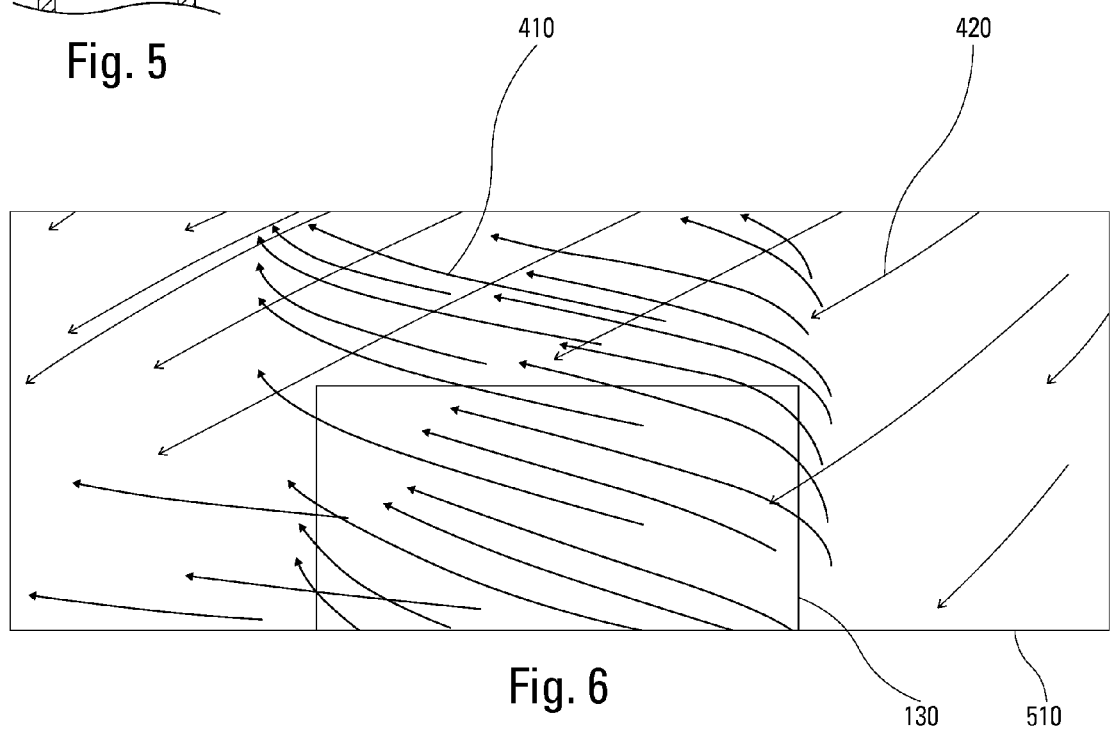
FIG. 6 depicts an expanded view of section 510 of FIG. 5 in accordance with certain embodiments.

As shown in FIG. 3, prechamber 100 may include a partial cross section 310. FIG. 4 depicts an expanded view 400 of the partial cross section 310 of FIG. 3 of prechamber volume 120 in which computational fluid dynamics (CFD) analysis evidences the direction and magnitude of velocity of the axial flow of the fuel-air mixture in-filling streams 930 (FIG. 9) in the prechamber volume 120. As shown in FIG. 5, prechamber 100 may include a partial cross section 510. FIG. 6 depicts an expanded view of the partial cross section 510 of FIG. 5 of prechamber volume 120 in which CFD analysis evidences the direction and magnitude of velocity of the axial flow of the fuel-air mixture in-filling streams 930 in the prechamber volume 120. As can be understood, a first direction axial flow 410 can be achieved in the rotational flow pattern 210 proximate the periphery 240 of the rotational flow pattern 210 and a counter second direction axial flow 420 can be achieved in the rotational flow pattern 210 proximate the center 250 of the rotational flow pattern 210. In certain embodiments, the prechamber 100 may include a substantially uniform velocity flow field, acting substantially in the axial direction of a region that includes the electrodes 130, thereby causing the flame kernel to develop substantially in the forward direction towards hole 320. In certain embodiments, the velocity flow field in the axial plane as shown in FIG. 4 may be bi-directional with a central counter flow. This type of flow may cause the flame front to propagate from the center 250 to the periphery 240 and back to the center 250 in a spiral motion and in a forward direction towards hole 320.

Figure 7:
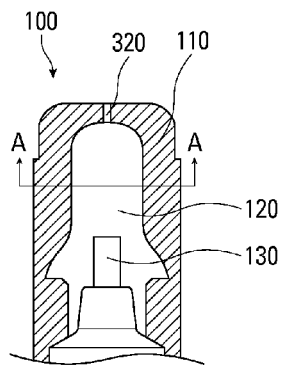
FIG. 7 depicts a prechamber in accordance with certain embodiments.
Figure 8:
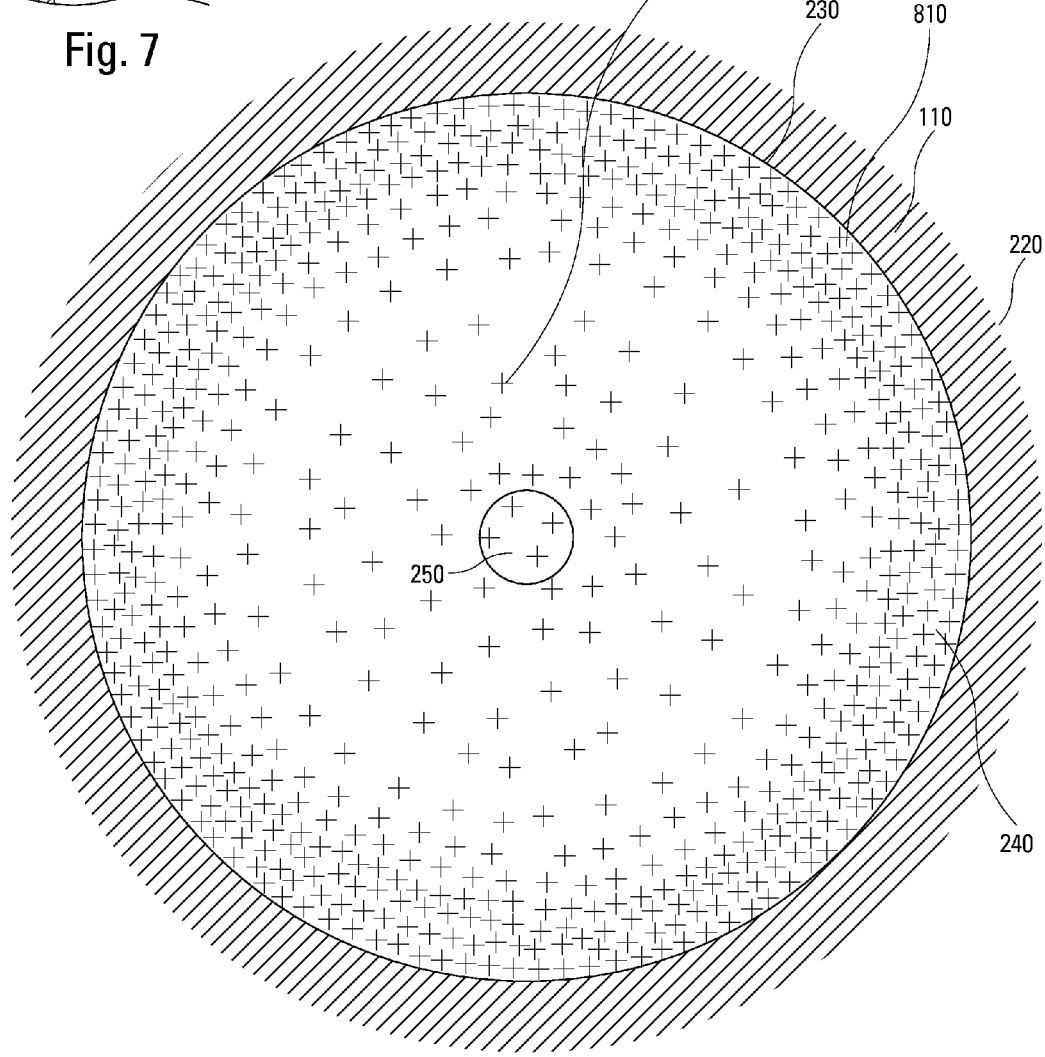
FIG. 8 is depicts a cross-sectional view 800 along cross-section A-A of FIG. 7 in accordance with certain embodiments.
Figure 9:
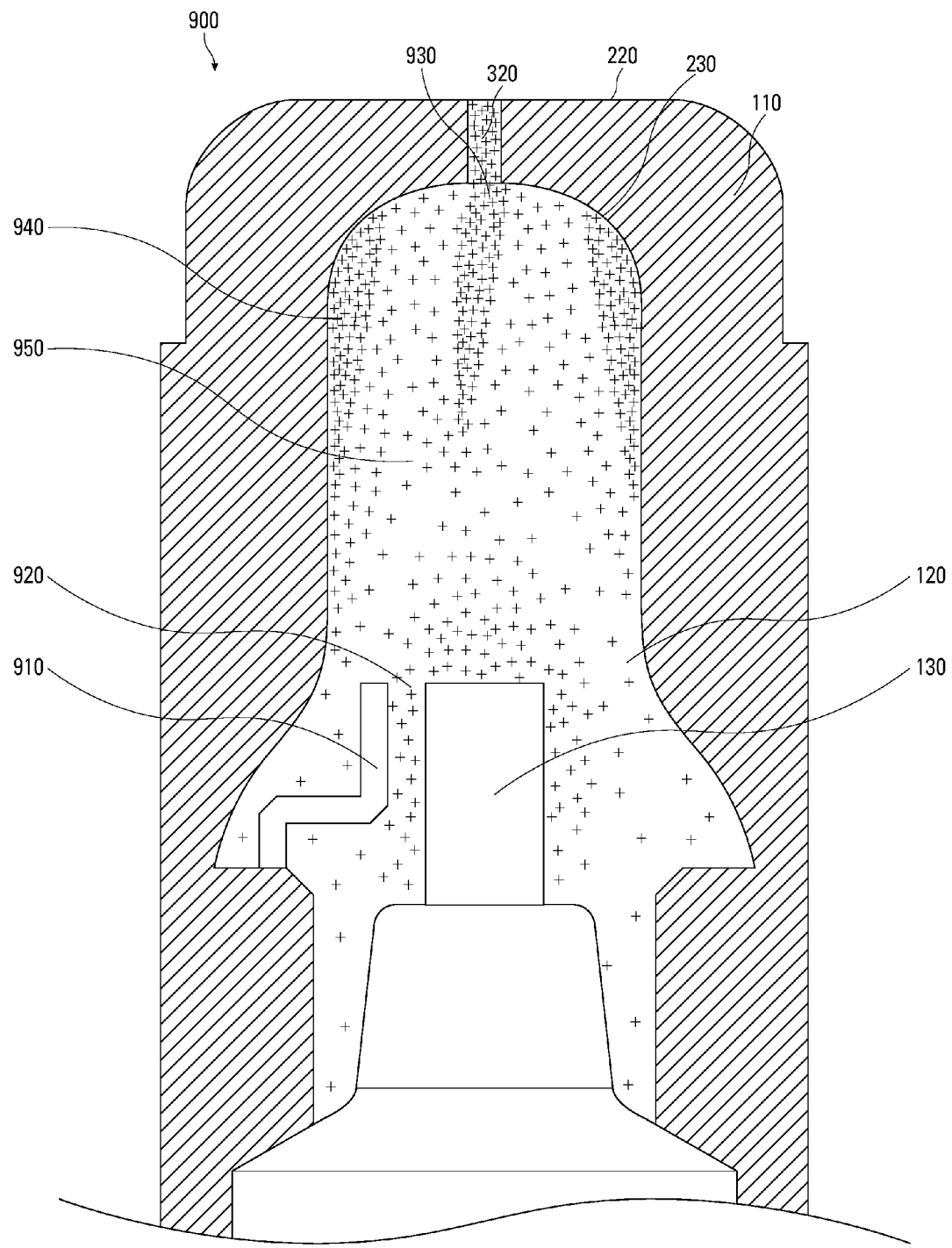
FIG. 9 depicts a prechamber 900 with an axial electrode showing fuel concentrations in accordance with certain embodiments.
Figure 10:
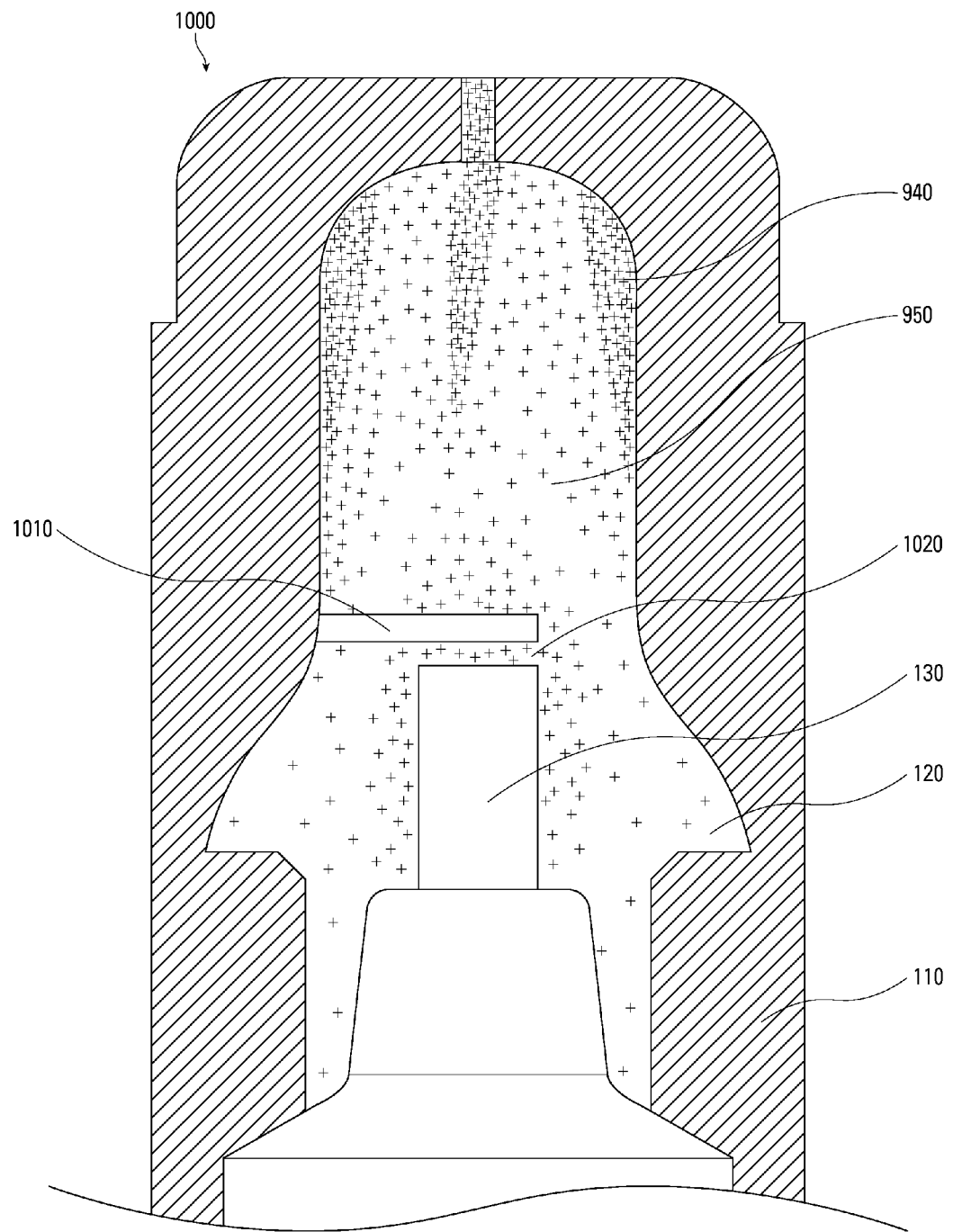
FIG. 10 depicts a prechamber 1000 with a transverse electrode showing fuel concentrations in accordance with certain embodiments.

In certain embodiments as shown in FIGS. 7 and 8, the prechamber 100 may be configured to provide fuel stratification. The combination of fuel stratification with the velocity flow fields of certain embodiments, may allow control of the flame kernel growth in the pre-combustion chamber and therefore of the ignition delay or start of combustion and the flame burn rate within a main combustion chamber (not shown). In FIGS. 8-10, the plus signs 820 represent fuel concentration, with higher fuel concentrations depicted by more plus signs 820 in a given area. In certain embodiments, lower fuel concentration may be achieved proximate the center electrode 130, as shown in FIG. 8, to reduce flame kernel growth rate and therefore increase ignition delay and retard the start of combustion in the main combustion chamber. In certain embodiments, higher fuel concentrations 810 may be achieved at the periphery 240 of the pre-combustion chamber volume 120 and towards the hole 320 as shown in FIG. 9.

In certain embodiments as shown in FIG. 9, electrode 130 and an axial ground electrode 910 may define a spark gap 920. Alternately, as shown in FIG. 10 electrode 130 and transverse ground electrode 1010 may form a spark gap 1020. These illustrations are merely exemplary as the spark gap may take any of numerous and varied geometries, as are well known in the art or otherwise. One of ordinary skill in the art further will recognize that electrode 130 may serve as the ground electrode, and axial electrode 910 or transverse electrode 1010 may have a higher voltage than ground electrode 130 to generate a spark in spark gap 920 or 1020 without departing from the scope of the present invention. A hole 320 disposed between the external surface 220 and the internal surface 230 of the prechamber wall 110 can direct a corresponding plurality of fuel-air mixture in-filling streams 930 into the prechamber volume 120. The prechamber 100, the plurality of holes 320 and the prechamber volume 120 can be configured to achieve a rotational flow field 210 (FIG. 2) of the fuel-air in-filling streams 930 inside of the prechamber volume 120 which may include the radial and axial flow characteristics as further described herein. In certain embodiments as shown in FIGS. 9 and 10, higher fuel concentrations 940 may be achieved at the periphery 240 of the pre-combustion chamber volume 120 and towards the holes 320 than the fuel concentrations 950 found elsewhere in pre-combustion chamber volume 120.

Figure 11:
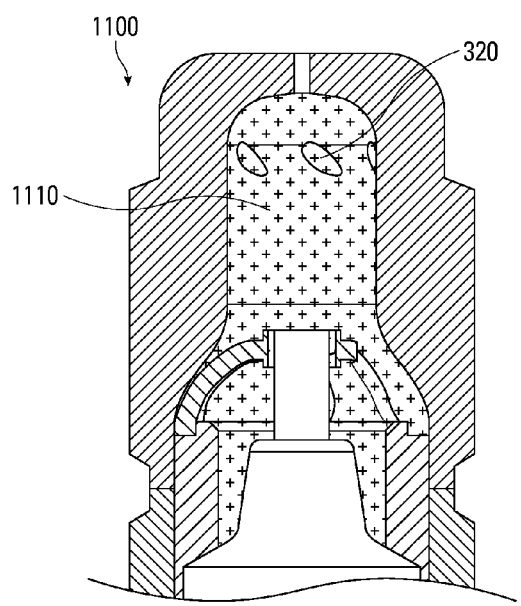
FIGS. 11-13 depict various portions of a prechamber 1100 with multiple axial electrodes in accordance with certain embodiments.
Figure 12:
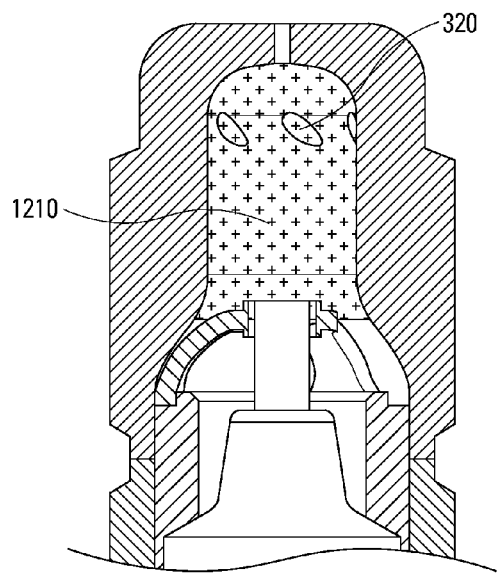
Figure 13:
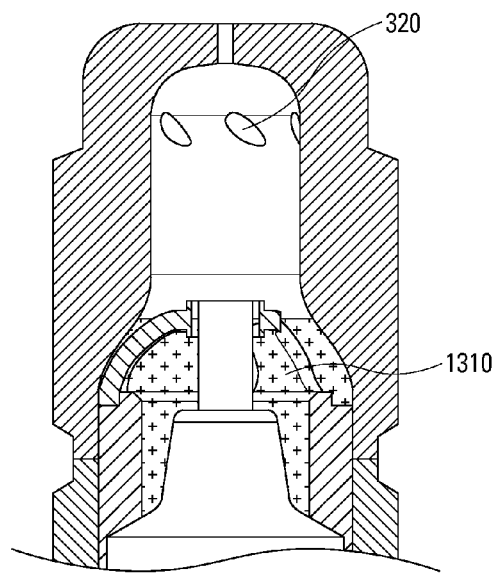

In certain embodiments as shown in FIGS. 11-13, the total pre-combustion chamber volume 1110 may be subdivided into a volume 1210 ahead of the electrodes and a volume 1310 behind the electrodes. In certain embodiments, the total pre-combustion chamber volume 1110 may include a volume from about 500 mm$^3$ to about 6000 mm$^3$. In certain embodiments, the volume 1210 ahead of the electrodes may include a volume from about 250 mm$^3$ to about 3000 mm$^3$. In certain embodiments, the volume 1310 behind the electrodes may include a volume from about 250 mm$^3$ to about 3000 mm$^3$.

Figure 14:
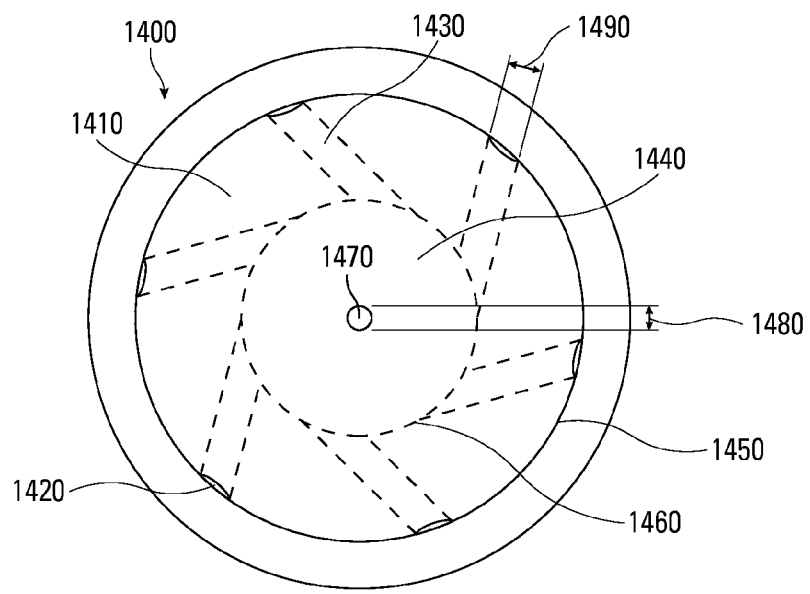
FIG. 14 depicts a top view of a prechamber in accordance with certain embodiments.

In certain embodiments as shown in FIG. 14, a prechamber spark plug may provide a prechamber 1400 having a prechamber wall 1410 of generally cylindrical form having a plurality of holes 1420 disposed in circumferentially spaced relation about the external surface 1450 of the prechamber wall 1410 through which a corresponding plurality of fuel-air mixture streams 1430 enter a plurality of holes 1420 through which the fuel-air mixture stream 1430 exits into the prechamber volume 1440. One center hole 1470 can be disposed between the external surface 1450 and the internal surface 1460 proximate to the top of the prechamber 1400. Each of the plurality of holes 1420 and center hole 1470 can correspondingly direct a plurality of the fuel-air mixture streams 1430 into the prechamber volume 120 to achieve a rotational flow pattern 410 inside the prechamber volume 120 with radial and axial flow characteristics, as further described herein.

Figure 15:
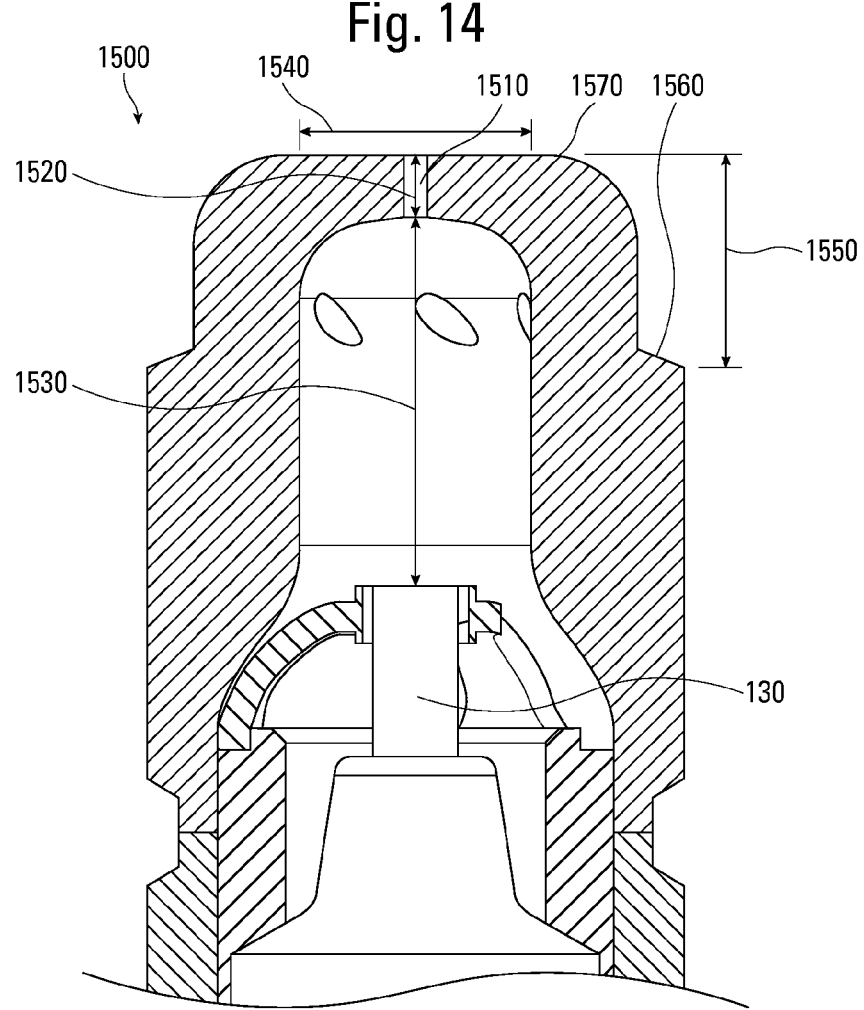
FIG. 15 depicts a side view of a prechamber with multiple axial electrodes in accordance with certain embodiments.

In certain embodiments as shown in FIG. 15, pre-combustion chamber 1500 may include a center hole 1510 with a center hole length 1520. In certain embodiments, the center hole length may be from about 1 mm to about 13 mm. In certain embodiments, a pre-combustion chamber ceiling distance ("L") 1530 from center electrode 130 may be from about 5 mm to about 85 mm. In certain embodiments, a pre-combustion chamber inner diameter ("D") 1540 may be from about 4 mm to about 35 mm. In certain embodiments, a pre-combustion chamber insertion depth 1550 from cylinder head firing deck 1560 to the top 1570 of the pre-combustion chamber 1500 may be from about 0 mm to about 25 mm.

Figure 16:
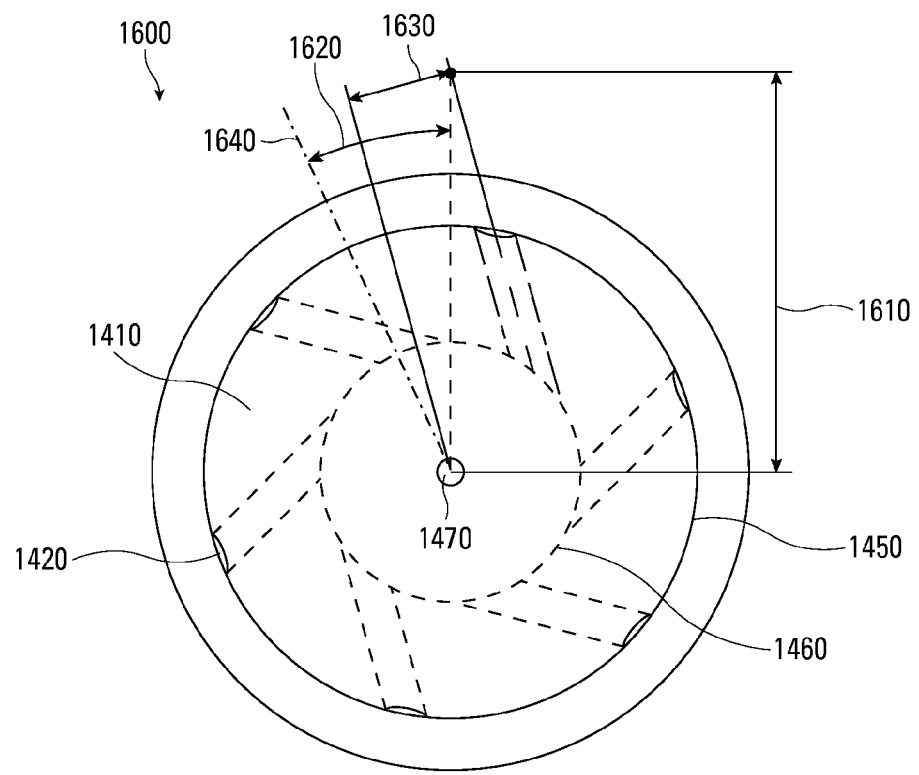
FIG. 16 depicts a top view of a prechamber in accordance with certain embodiments.

In certain embodiments as shown in FIGS. 14 and 16 each of the plurality of holes 1420 can be disposed in angled communication between the external surface 1450 and the internal surface 1460 of the prechamber wall 1410 to direct a corresponding plurality of fuel-air mixture in-filling streams into the prechamber volume 120 around the periphery of the internal surface 1460 to achieve the rotational flow pattern 210 (FIG. 2) of the air-fuel mixture in-filling streams 1430 inside of the prechamber volume 120 such that rotation occurs about the central longitudinal axis of the prechamber 1400.

In certain embodiments, the number of holes 1420 may be from about 1 to about 12. The diameter 1490 of holes 1420 may be from about 0.5 mm to about 4.0 mm. The diameter 1480 of center hole 1470 may be from about 0.5 mm to about 4.0 mm. Each of holes 1420 may define a pattern radius 1610, an index angle 1620 which is measured from a reference 1640, and a rotational offset 1630. In certain embodiments, the pattern radius 1610 may be from about 2 mm and about 10 mm. In certain embodiments, the index angle 1620 for the first hole may be about 0 degrees to about 120 degrees. In certain embodiments, the rotational offset 1630 may be about 0 mm to about 10 mm.

Figure 17:
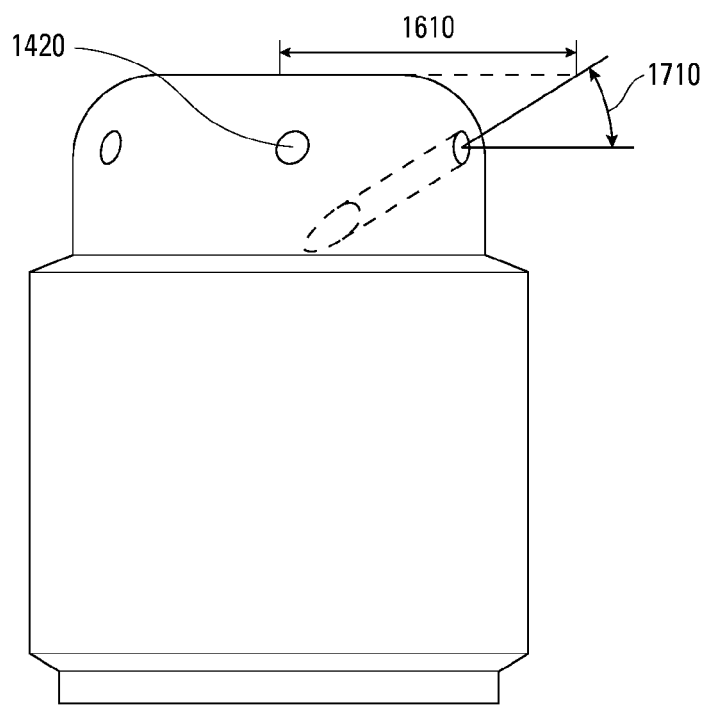
FIG. 17 depicts a side view of a prechamber in accordance with certain embodiments.

In certain embodiments as shown in FIG. 17, each of holes 1420 may define a penetration angle 1710. In certain embodiments, penetration angle 1710 may be about 10 degrees to about 75 degrees.

As will be understood by one of ordinary skill in the art, the pre-determined configuration of the prechamber 1600 and plurality of holes 1420 can achieve a rotational flow pattern 210 having a velocity of the fuel-air mixture in-filling streams 1430 in the rotational flow pattern 210 greater proximate the periphery 240 of rotational flow pattern 210 and lesser proximate the center 250 of the rotational flow pattern 210; however, the invention is not so limited and the velocity of the fuel-air mixture in-filling streams 1430 in the rotational flow pattern 210 can be adjusted by altering the configuration and the angle of one or more of the plurality of holes 1420 disposed in the prechamber wall 1410 to achieve other rotational flows having, for example, greater velocity at the center 250 of the rotational flow pattern 210 and lesser at the periphery 240, or permutations and combinations thereof.

Figure 18:
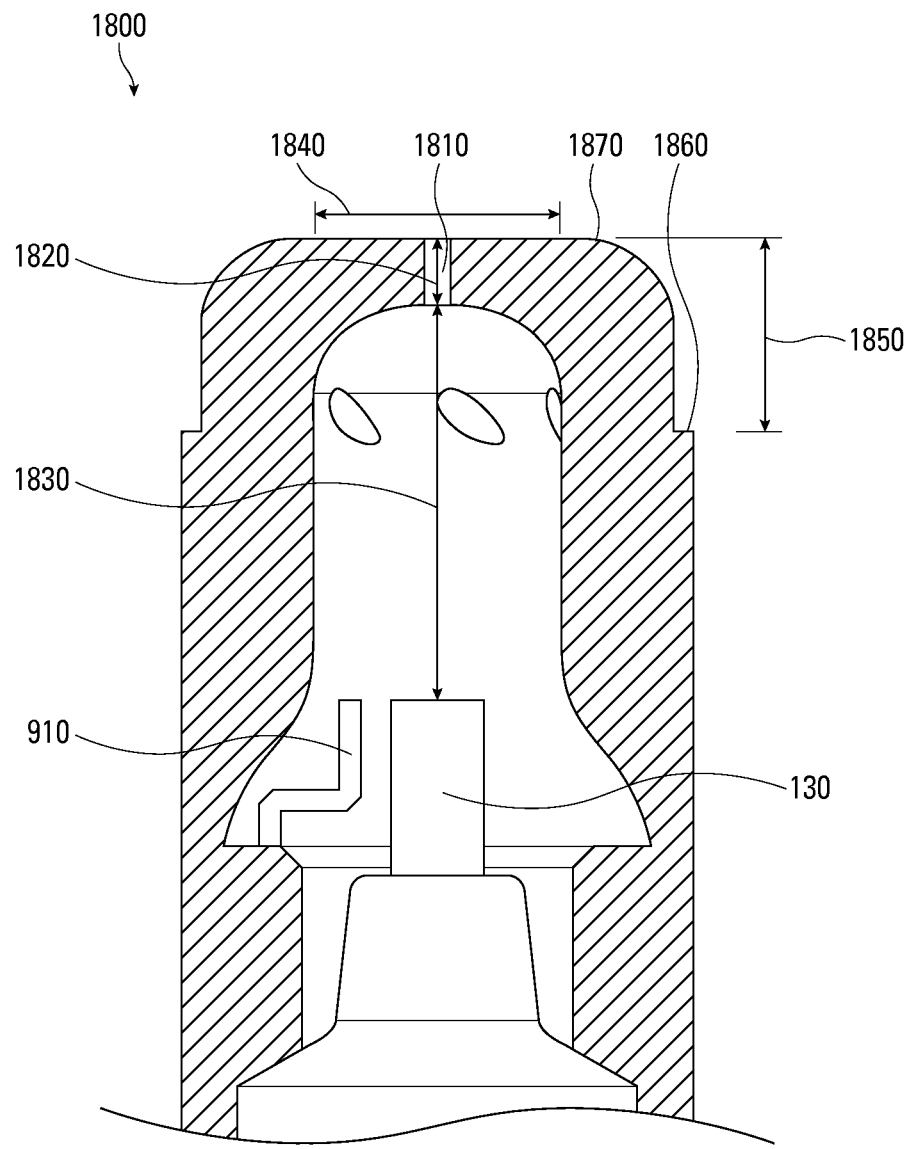
FIG. 18 depicts a side view of a prechamber with an axial electrode in accordance with certain embodiments.

In certain embodiments as shown in FIG. 18, pre-combustion chamber 1800 with an axial electrode 910 may include a center hole 1810 with a center hole length 1820. In certain embodiments, the center hole length may be from about 1 mm to about 13 mm. In certain embodiments, a pre-combustion chamber ceiling distance ("L") 1830 from center electrode 130 may be from about 5 mm to about 85 mm. In certain embodiments, a pre-combustion chamber inner diameter ("D") 1840 may be from about 4 mm to about 35 mm. In certain embodiments, a pre-combustion chamber insertion depth 1850 from cylinder head firing deck 1860 to the top 1870 of the pre-combustion chamber 1800 may be from about 0 mm to about 25 mm.

Figure 19:
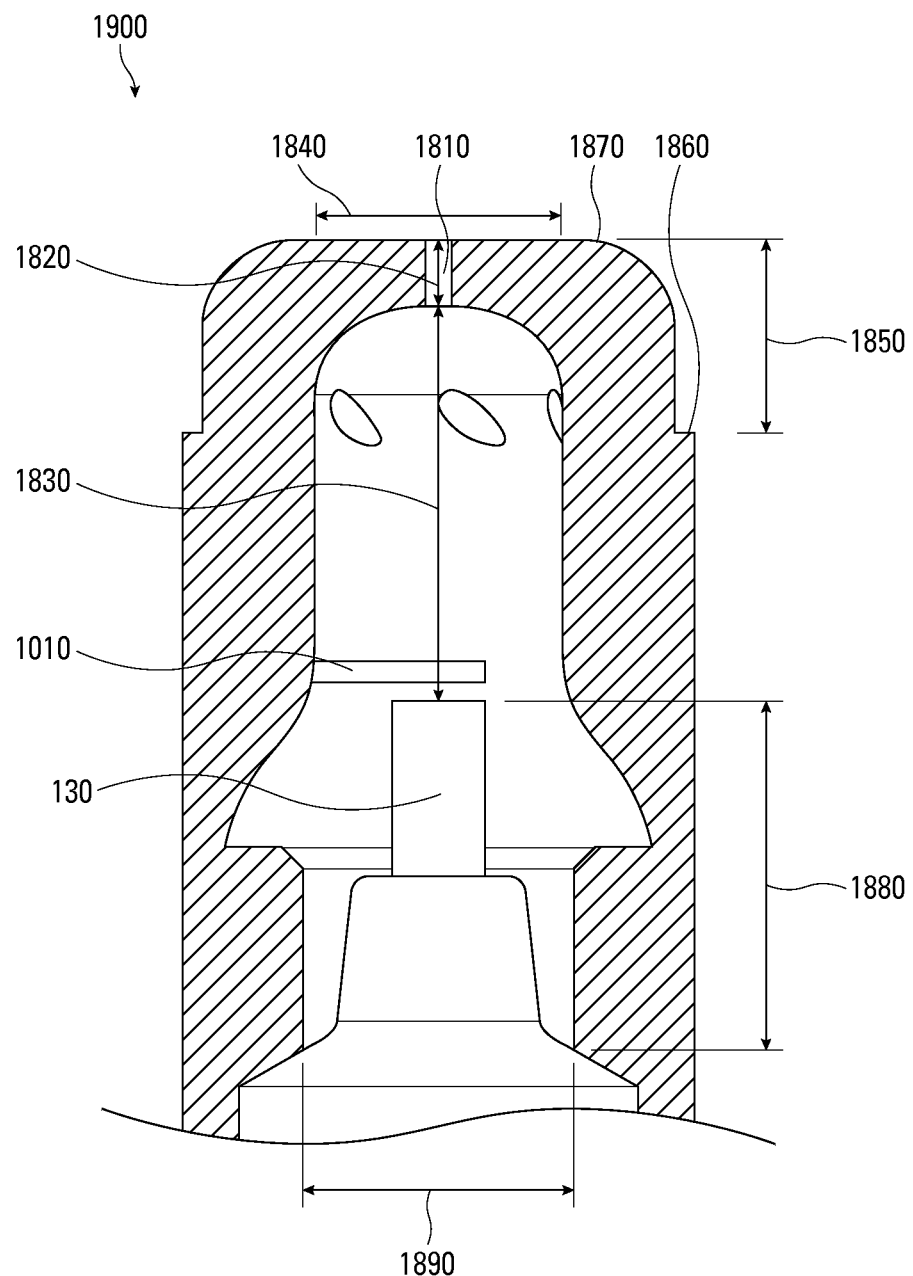
FIG. 19 depicts a side view of a prechamber with a transverse electrode in accordance with certain embodiments.

In certain embodiments as shown in FIG. 19, pre-combustion chamber 1900 with a transverse electrode 1010 may include a center hole 1810 with a center hole length 1820. In certain embodiments, the center hole length may be from about 1 mm to about 13 mm. In certain embodiments, a pre-combustion chamber ceiling distance ("L") 1830 from center electrode 130 may be from about 5 mm to about 85 mm. In certain embodiments, a pre-combustion chamber inner diameter ("D") 1840 may be from about 4 mm to about 35 mm. In certain embodiments, a pre-combustion chamber insertion depth 1850 from cylinder head firing deck 1860 to the top 1870 of the pre-combustion chamber 1800 may be from about 0 mm to about 25 mm.

In certain embodiments, an aspect ratio ("L/D") may be defined as the ratio of ceiling distance ("L") 1830 to pre-combustion chamber inner diameter ("D") 1840. In certain embodiments, the aspect ratio may be about 0.5 to about 3. In certain embodiments, two aspect ratios may be considered, a top aspect ratio for the top portion of the prechamber volume above the center electrode defined as the ratio of (L) 1830 to (D) 1840 and a bottom aspect ratio for the bottom portion of the prechamber volume below the top of the center electrode defined as the ratio of ("$L_B$") 1880 to ("$D_B$") 1890. In certain embodiments, the top aspect ratio may be about 0.5 to about 3. In certain embodiments, the top aspect ratio may be greater than about 1 and the bottom aspect ratio may be approximately 1.

Figure 20:
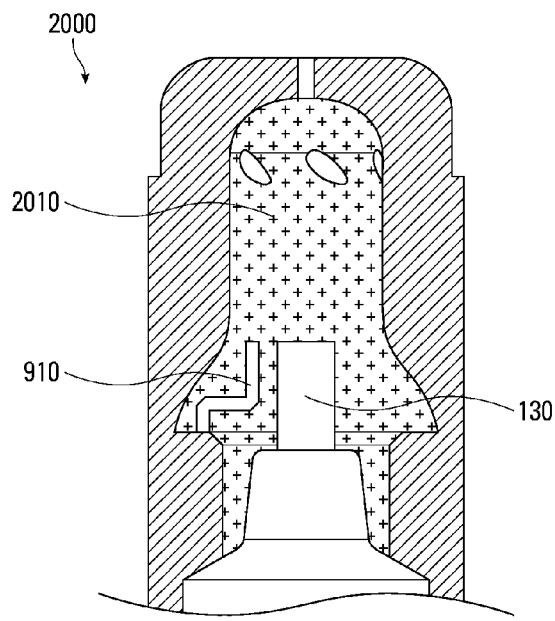
FIGS. 20-22 depict various portions of a prechamber with an axial electrode in accordance with certain embodiments.
Figure 21:
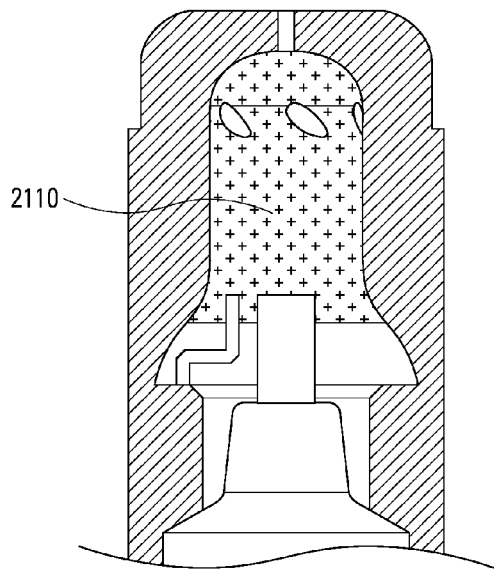
Figure 22:
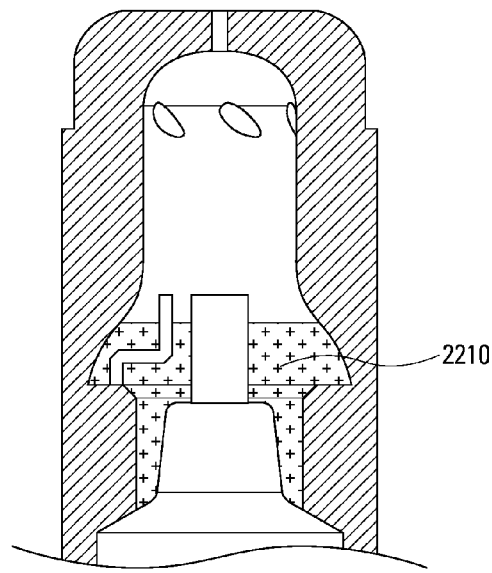

In certain embodiments as shown in FIGS. 20-22, a pre-combustion chamber 2000 may include a center electrode 130 and an axial electrode 910 as shown. The total pre-combustion chamber volume 2010 may be subdivided into a volume 2110 ahead of the electrodes and a volume 2210 behind the electrodes. In certain embodiments, the total pre-combustion chamber volume 2010 may include a volume from about 500 mm$^3$ to about 6000 mm$^3$. In certain embodiments, the volume 2110 ahead of the electrodes may include a volume from about 250 mm$^3$ to about 3000 mm$^3$. In certain embodiments, the volume 2210 behind the electrodes may include a volume from about 250 mm$^3$ to about 3000 mm$^3$.

In certain embodiments as shown in FIGS. 23-25, a pre-combustion chamber 2300 may include a center electrode 130 and a transverse electrode 1010 as shown. The total pre-combustion chamber volume 2310 may be subdivided into a volume 2410 ahead of the electrodes and a volume 2510 behind the electrodes. In certain embodiments, the total pre-combustion chamber volume 2310 may include a volume from about 500 mm$^3$ to about 6000 mm$^3$. In certain embodiments, the volume 2410 ahead of the electrodes may include a volume from about 250 mm$^3$ to about 3000 mm$^3$. In certain embodiments, the volume 2510 behind the electrodes may include a volume from about 250 mm$^3$ to about 3000 mm$^3$.

Figure 26:
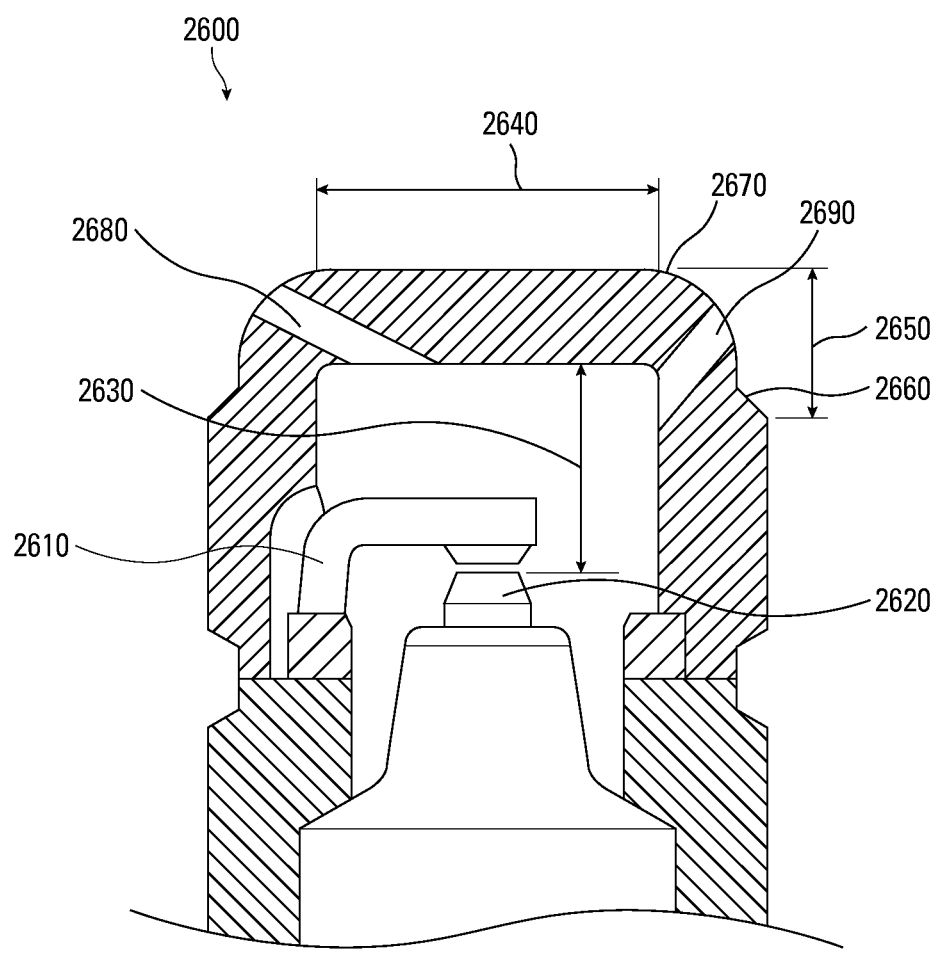
FIG. 26 depicts a side view of a prechamber with a transverse electrode in accordance with certain embodiments.

In certain embodiments as shown in FIG. 26, pre-combustion chamber 2600 may include a j-gap electrode 2610 and center electrode 2620. In certain embodiments, a pre-combustion chamber ceiling distance ("L") 2630 from center electrode 2620 may be from about 5 mm to about 85 mm. In certain embodiments, a pre-combustion chamber inner diameter ("D") 2640 may be from about 4 mm to about 35 mm. In certain embodiments, a pre-combustion chamber insertion depth 2650 from cylinder head firing deck 2660 to the top 2670 of the pre-combustion chamber 2600 may be from about 0 mm to about 25 mm. In one non-limiting embodiment, (L) 2630 may be about 6.71 mm; (D) may be about 11 mm and the aspect ratio L/D may be about 0.61. In certain embodiments, pre-combustion chamber 2600 may include one or more inner holes 2680 and one or more outer holes 2690. The one or more inner holes 2680 may be located closer to the central longitudinal axis of pre-combustion chamber 2600 than the one or more outer holes 2690.

Figure 27:
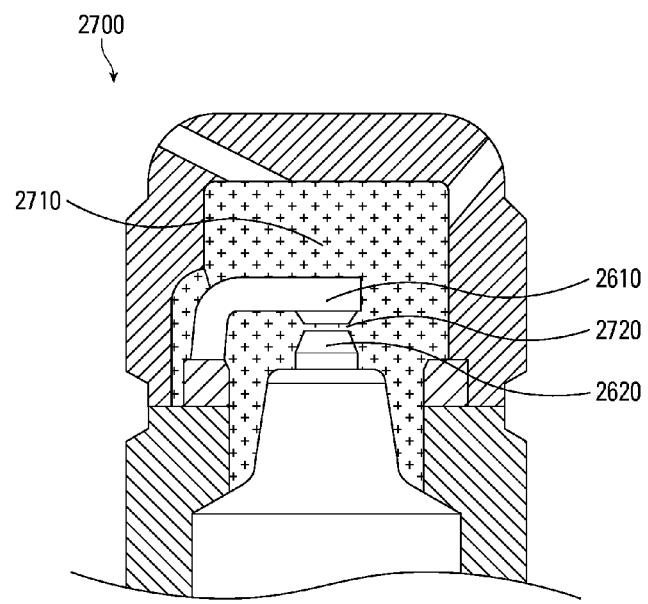
FIGS. 27-29 depict various portions of a prechamber with a transverse electrode in accordance with certain embodiments.
Figures 28, 29:
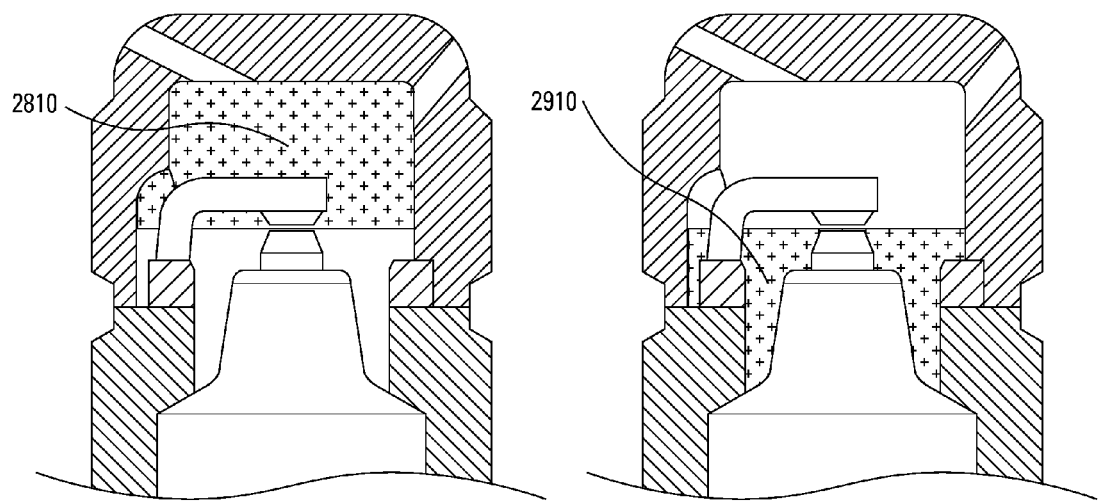

In certain embodiments as shown in FIGS. 27-29, a pre-combustion chamber 2700 may include a center electrode 2620 and a transverse electrode 2610 as shown. The total pre-combustion chamber volume 2710 may be subdivided into a volume 2810 ahead of the electrodes and a volume 2910 behind the electrodes. In certain embodiments, the total pre-combustion chamber volume 2710 may include a volume from about 500 mm$^3$ to about 6000 mm$^3$. In certain embodiments, the volume 2810 ahead of the electrodes may include a volume from about 250 mm$^3$ to about 3000 mm$^3$. In certain embodiments, the volume 2910 behind the electrodes may include a volume from about 250 mm$^3$ to about 3000 mm$^3$.

Figure 30:
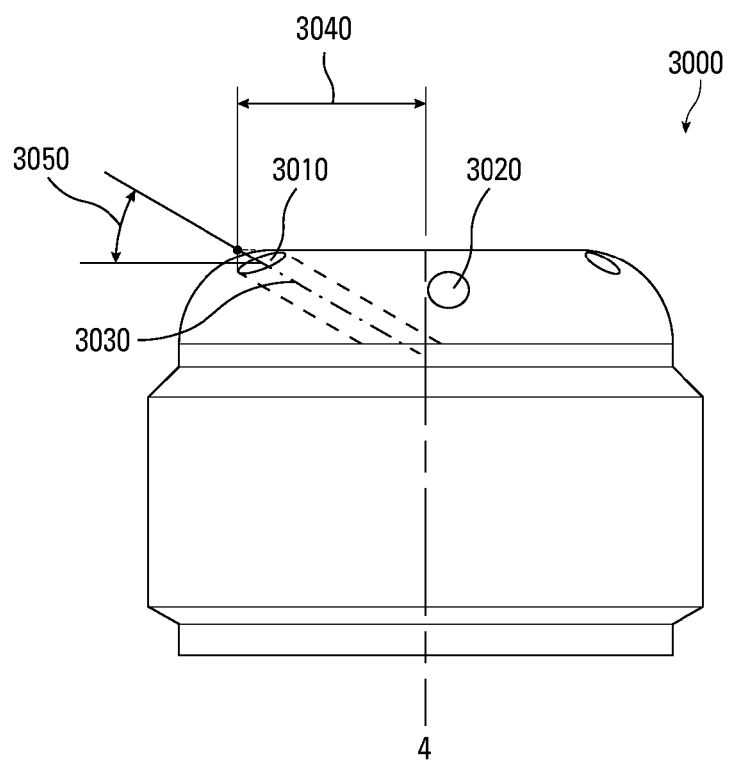
FIG. 30 depicts a side view of a prechamber in accordance with certain embodiments.
Figure 31:
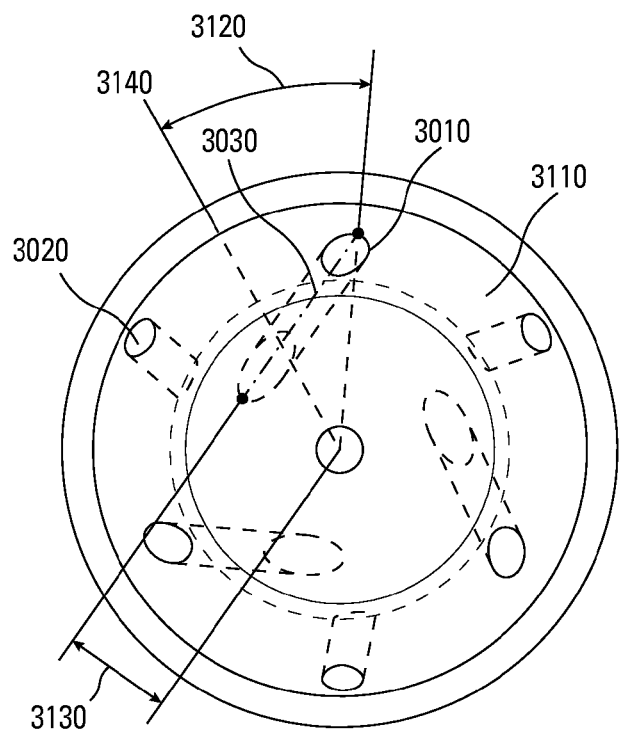
FIG. 31 depicts a top view of a prechamber in accordance with certain embodiments.

In certain embodiments as shown in FIGS. 30 and 31, a prechamber spark plug may provide a prechamber 3000 having a prechamber wall 3110. In certain embodiments, prechamber 3000 may include one or more inner holes 3010 through which a corresponding plurality of fuel-air mixture streams 3030 may enter. In certain embodiments, prechamber 3000 further may include one or more outer holes 3020 through which a corresponding plurality of fuel-air mixture streams 3030 may enter. Each of the one or more inner holes 3010 and each of the one or more outer holes 3020 may correspondingly direct a fuel-air mixture stream 3030 into the prechamber volume 120 to achieve a rotational flow pattern 210 (FIG. 2) inside the prechamber volume 120 with radial and axial flow characteristics, as further described herein.

In certain embodiments as shown in FIGS. 30 and 31, each of the one or more inner holes 3010 and each of the one or more outer holes 3020 may be disposed in angled communication between the external surface 220 and the internal surface 230 of the prechamber wall 3110 to direct a corresponding fuel-air mixture in-filling stream into the prechamber volume 120 around the periphery of the internal surface 230 to achieve a rotational flow pattern 210 of the air-fuel mixture in-filling streams inside of the prechamber volume 120 such that rotation occurs about the central longitudinal axis of the prechamber 3000.

In certain embodiments, the number of inner holes 3010 may be from about 1 to about 12. The diameter of inner holes 3010 may be from about 0.5 mm to about 4.0 mm. In certain embodiments, the number of outer holes 3020 may be from about 1 to about 12. The diameter of outer holes 3020 may be from about 0.5 mm to about 4.0 mm. Each of inner holes 3010 and outer holes 3020 may define a pattern radius 3040, an index angle 3120 which is measured from a reference 3140, and a rotational offset 3130. In certain embodiments, the pattern radius 3040 for the inner holes 3010 may be from about 2 mm and about 10 mm. In certain embodiments, the index angle 3120 for the first of the inner holes 3010 may be about 0 degrees to about 120 degrees. In certain embodiments, the rotational offset 3130 for the inner holes 3010 may be about 0 mm to about 10 mm. In certain embodiments, the pattern radius 3040 for the outer holes 3020 may be from about 2 mm and about 10 mm. In certain embodiments, the index angle 3120 for the first of the outer holes 3020 may be about 0 degrees to about 120 degrees. In certain embodiments, the rotational offset 3130 for the outer holes 3020 may be about 0 mm to about 10 mm.

In certain embodiments as shown in FIGS. 30 and 31, each of inner holes 3010 and outer holes 3020 may define a penetration angle 3050. In certain embodiments, penetration angle 3050 may be about 10 degrees to about 75 degrees for the inner holes 3010. In certain embodiments, penetration angle 3050 may be about 0 degrees to about 90 degrees for the outer holes 3020.

Now referring primarily to FIGS. 9-10, which provides a cross-sectional side view of the prechamber volume 120 which shows that axial stratification of the air-fuel ratio can be achieved in the rotational flow pattern 210 (FIG. 2). As to the particular non-limiting embodiment shown the air-fuel ratio is richer (the darker the area the greater the amount of fuel) proximate the plurality of holes 320 and internal surface 230 of the prechamber wall 110 and leaner proximate the center of the prechamber volume 120 and proximate the electrode 130.

In certain embodiments, the direction and magnitude of velocity of the radial flows within the rotational flow pattern 210 and the magnitude of the velocity of the first direction axial flow 410 and the counter second direction axial flow 420 within the rotational flow pattern 210 and the radial and axial stratification of the air-fuel ratios within the prechamber volume 120 can be adjusted to achieve pre-determined combustion performance characteristics through alteration of the prechamber 3000 geometry and angles of the inner holes 3010 and/or outer holes 3020.

As one illustrative non-limiting example, the velocity of the air-fuel mixture at the periphery 240 of the rotational flow pattern 210 in the volume ahead of the electrodes 2810 can be greater than 10 m/s. The velocity of the fuel-air mixture at the periphery 250 of the volume behind the electrodes 2910 can be greater than 5 m/s. The fuel-air mixture velocity at the spark gap 2720 can be greater than 5 m/s and substantially uniform. The counter second direction axial flow 420 velocity at the spark gap 2720 can be 5 m/s and substantially uniform.

However the magnitude of the velocities of the radial flow and axial flows are not intended to be limiting but illustrative of the velocities which can be achieved by pre-determined combinations of prechamber geometry aspect ratio and hole pattern. For example, the plurality of holes can be equidistantly circumferentially-spaced about a substantially cylindrical prechamber wall. One center hole can be disposed in the top of the prechamber wall to provide axial ingress of a corresponding air-fuel in-filling stream. The inner and outer holes can also provide axial ingress of corresponding air-fuel in-filling streams. Understandably, the dimensional relations, angle, and location of the plurality of holes along with the geometry of the prechamber can be varied to adjust the direction, magnitude of velocity, and air-fuel ratio within the rotational flow pattern as to the radial flows and the axial flows above-described and shown in the Figures. The angles of the holes can be aimed at one or more of internal surfaces of the bottom cylindrical portion, the top cylindrical portion, the electrode structures, the electrode gap, or the spark plug structure. All possible combinations for length to diameter, hole angles, hole number, hole size, hole shape and hole location are encompassed by configurations of the prechamber geometry to achieve the desired patterns and velocity of the fuel-air mixture in prechamber in relation to a particular spark gap geometry. Accordingly for any given spark gap geometry and combustion performance requirements there is a particular combination of prechamber geometry aspect ratio and hole configuration that can achieve high power flame jets with the desired ignition delay and reduced propensity to flame quenching and autoignition.

The directed delivery of the fuel-air in-filling streams proximate the periphery of the internal surface of the prechamber wall may result in a rotational flow of the fuel-air in-filing streams inside the prechamber volume of the prechamber during the compression stroke of a gas engine. This rotational flow field may persist through the cycle such that when the gases in the prechamber volume are ignited, the flame is quickly swept across the prechamber volume resulting in a reproducible combustion event within the prechamber and production of high power flame jets from the plurality of holes inducing rapid combustion of the fuel-air mixture within the cylinder of the gas engine.

As can be easily understood from the foregoing, the basic concepts of the present invention may be embodied in a variety of ways. The invention involves numerous and varied embodiments of an inventive prechamber spark plug configured to generate a rotational flow of fuel-air in-filling streams in the prechamber volume including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "spark" should be understood to encompass disclosure of the act of "sparking"—whether explicitly discussed or not—and, conversely, were there effectively disclosure of the act of "sparking", such a disclosure should be understood to encompass disclosure of a "spark" and even a "means for sparking." Such alternative terms for each element or step are to be understood to be explicitly included in the description.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the prechamber spark plugs herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A pre-combustion chamber comprising:
 a prechamber comprising an external surface and an internal surface enclosing a prechamber volume;
 one or more holes communicating between the external surface and the internal surface for introducing a fuel-air mixture into the prechamber volume, each of the one or more holes comprising a hole axis that defines an index angle and a rotational offset for creating a spiral flow pattern of the fuel-air mixture in the prechamber volume;
 a primary electrode disposed within the prechamber volume;
 one or more ground electrodes disposed within the prechamber volume and offset from the primary electrode to form one or more electrode gaps.

2. The pre-combustion chamber of claim 1, wherein the spiral flow pattern of the fuel-air mixture comprises a center and a periphery and comprises a higher velocity proximate the periphery than proximate the center.

3. The pre-combustion chamber of claim 1, wherein the spiral flow pattern comprises a center and a periphery and comprises a higher velocity proximate the center than proximate the periphery.

4. The pre-combustion chamber of claim 1, wherein the hole axis further defines a penetration angle for creating an axial flow pattern of the fuel-air mixture in the prechamber volume.

5. The pre-combustion chamber of claim 4, wherein the axial flow pattern comprises a substantially uniform velocity flow field acting in a substantially axial direction proximate the primary electrode to cause a flame kernel to develop substantially in a forward direction toward one or more of the one or more holes.

6. The pre-combustion chamber of claim 4, wherein the axial flow pattern comprises a first axial flow pattern proximate a periphery of the prechamber and a second axial flow pattern proximate a center of the prechamber.

7. The pre-combustion chamber of claim 6, wherein the second axial flow pattern is substantially counter to the first axial flow pattern.

8. The pre-combustion chamber of claim 4, wherein the penetration angle of each of the one or more holes is between about 10 degrees and about 75 degrees.

9. The pre-combustion chamber of claim 1, wherein the index angle of a first hole of the one or more holes is between about 0 degrees and about 120 degrees.

10. The pre-combustion chamber of claim 1, wherein the rotational offset of each of the one or more holes is between about 0 mm and about 10 mm.

11. The pre-combustion chamber of claim 1, wherein the one or more holes comprise one or more inner holes comprising an inner hole axis and one or more outer holes comprising an outer hole axis and wherein each inner hole axis and each outer hole axis defines an index angle, a penetration angle and a rotational offset.

12. The pre-combustion chamber of claim 11, wherein the one or more inner holes are located closer to a central longitudinal axis of the prechamber than the one or more outer holes.

13. The pre-combustion chamber of claim 11, wherein an index angle of a first inner hole of the one or more inner holes is between about 0 degrees and about 120 degrees.

14. The pre-combustion chamber of claim 11, wherein an index angle of a first outer hole of the one or more outer holes is between about 0 degrees and about 120 degrees.

15. The pre-combustion chamber of claim 11, wherein a rotational offset of each of the one or more inner holes is between about 0 mm and about 10 mm.

16. The pre-combustion chamber of claim 11, wherein a rotational offset of each of the one or more outer holes is between about 0 mm and about 10 mm.

17. The pre-combustion chamber of claim 11, wherein a penetration angle of each of the one or more inner holes is between about 10 degrees and about 75 degrees.

18. The pre-combustion chamber of claim 11, wherein a penetration angle of each of the one or more outer holes is between about 0 degrees and about 90 degrees.

19. The pre-combustion chamber of claim 11, wherein a pattern radius of each of the one or more inner holes is between about 2 mm and about 10 mm.

20. The pre-combustion chamber of claim 11, wherein a pattern radius of each of the one or more outer holes is between about 3 mm and about 5 mm.

21. The pre-combustion chamber of claim 1, wherein the prechamber volume comprises a top portion above a top surface of the primary electrode and a bottom portion below the top surface of the primary electrode.

22. The pre-combustion chamber of claim 21, wherein the bottom portion is configured to allow mixing and cooling of residual gases to prevent autoignition before introduction of a spark.

23. The pre-combustion chamber of claim 21, wherein the bottom portion has a volume from about 250 mm$^3$ to about 3000 mm$^3$.

24. The pre-combustion chamber of claim 21, wherein the bottom portion has an aspect ratio from about 0.5 to about 3.

25. The pre-combustion chamber of claim 21, wherein the top portion is configured to allow retention of an ignitable fuel-air mixture to generate one or more flame jets out of one or more of the one or more holes upon introduction of a spark.

26. The pre-combustion chamber of claim 21, wherein the top portion has a volume from about 250 mm$^3$ to about 3000 mm$^3$.

27. The pre-combustion chamber of claim 21, wherein the top portion has an aspect ratio from about 0.5 to about 3.

28. The pre-combustion chamber of claim 21, wherein the top portion has an aspect ratio greater than 1 and the bottom portion has an aspect ratio of approximately 1.

29. The pre-combustion chamber of claim 1, wherein the one or more ground electrodes are offset radially from the primary electrode.

30. The pre-combustion chamber of claim 1, wherein the one or more ground electrodes are offset axially from the primary electrode.

31. The pre-combustion chamber of claim 1, wherein the concentration of fuel proximate a periphery of the prechamber volume is higher than the average fuel concentration in the fuel-air mixture.

32. The pre-combustion chamber of claim 1, wherein the concentration of fuel is higher proximate the one or more holes than the average fuel concentration in the fuel-air mixture.

33. The pre-combustion chamber of claim 1, wherein the concentration of fuel proximate the one or more electrode gaps is lower than the average fuel concentration in the fuel-air mixture to increase ignition delay.

34. A method of generating high momentum flame jets, comprising:
providing a prechamber comprising:
an external surface and an internal surface enclosing a prechamber volume;
one or more holes communicating between the external surface and the internal surface for introducing a fuel-air mixture into the prechamber volume, each of the one or more holes comprising a hole axis that defines an index angle and a rotational offset for creating a spiral flow pattern of the fuel-air mixture in the prechamber volume;
a primary electrode disposed within the prechamber volume;
one or more ground electrodes disposed within the prechamber volume and offset from the primary electrode to form one or more electrode gaps;
introducing one or more fuel-air in-filling streams to the prechamber volume through the one or more holes, wherein the one or more fuel-air in-filling streams create a spiral flow pattern about a central longitudinal axis of the prechamber; and
introducing a spark across at least one of the one or more electrodes gaps to ignite the fuel-air mixture.

35. The method of claim 34, wherein the spiral flow pattern comprises a center and a periphery and comprises a higher velocity proximate the periphery than proximate the center.

36. The method of claim 34, wherein the spiral flow pattern comprises a center and a periphery and comprises a higher velocity proximate the center than proximate the periphery.

37. The method of claim 34, wherein the one or more fuel-air in-filling stream create an axial flow pattern in the prechamber.

38. The method of claim 37, wherein the axial flow pattern comprises a substantially uniform velocity flow field acting substantially in an axial direction proximate the primary electrode to cause a flame kernel to develop substantially in a forward direction toward one or more of the one or more holes.

39. The method of claim 37, wherein the axial flow pattern comprises a first axial flow pattern proximate a periphery of the prechamber and a second axial flow pattern proximate a center of the prechamber.

40. The method of claim 37, wherein the second axial flow pattern is substantially counter to the first axial flow pattern.

41. The method of claim 34, wherein the index angle of a first hole of the one or more holes is between about 0 degrees and about 120 degrees.

42. The method of claim 34, wherein the rotational offset of each of the one or more holes is between about 0 mm and about 10 mm.

43. The method of claim 34, wherein the hole axis further defines a penetration angle for creating a forward flow of the fuel-air mixture in the prechamber volume.

44. The method of claim 43, wherein the penetration angle of each of the one or more holes is between about 10 degrees and about 75 degrees.

45. The method of claim 34, wherein the one or more holes comprise one or more inner holes comprising an inner hole axis and one or more outer holes comprising an outer hole axis and wherein each inner hole axis and each outer hole axis defines an index angle, a penetration angle and a rotational offset.

46. The method of claim 45, wherein the one or more inner holes are located closer to the central longitudinal axis of the prechamber than the one or more outer holes.

47. The method of claim 45, wherein an index angle of a first inner hole of the one or more inner holes is between about 0 degrees and about 120 degrees.

48. The method of claim 45, wherein an index angle of a first outer hole of the one or more outer holes is between about 0 degrees and about 120 degrees.

49. The method of claim 45, wherein a rotational offset of each of the one or more inner holes is between about 0 mm and about 10 mm.

50. The method of claim 45, wherein a rotational offset of each of the one or more outer holes is between about 0 mm and about 10 mm.

51. The method of claim 45, wherein the penetration angle in configured for creating a forward flow of the fuel-air mixture in the prechamber volume.

52. The method of claim 51, wherein a penetration angle of each of the one or more inner holes is between about 10 degrees and about 75 degrees.

53. The method of claim 51, wherein a penetration angle of each of the one or more outer holes is between about 0 degrees and about 90 degrees.

54. The method of claim 45, wherein a pattern radius of each of the one or more inner holes is between about 2 mm and about 10 mm.

55. The method of claim 45, wherein a pattern radius of each of the one or more outer holes is between about 3 mm and about 5 mm.

56. The method of claim 34, wherein the prechamber volume comprises a top portion above a top surface of the primary electrode and a bottom portion below the top surface of the primary electrode.

57. The method of claim 56, wherein the bottom portion is configured to allow mixing and cooling of residual gases to prevent autoignition before introduction of the spark.

58. The method of claim 56, wherein the bottom portion has a volume from about 250 $mm^3$ to about 3000 $mm^3$.

59. The method of claim 56, wherein the bottom portion has an aspect ratio from about 0.5 to about 3.

60. The method of claim 56, wherein the top portion is configured to allow the retention of an ignitable fuel-air mixture to generate one or more flame jets out of one or more of the holes upon introduction of the spark.

61. The method of claim 56, wherein the top portion has a volume from about 250 $mm^3$ to about 3000 $mm^3$.

62. The method of claim 56, wherein the top portion has an aspect ratio from about 0.5 to about 3.

63. The method of claim 56, wherein the top portion has an aspect ratio greater than 1 and the bottom portion has an aspect ratio of approximately 1.

64. The method of claim 34, wherein the one or more ground electrodes are offset radially from the primary electrode.

65. The method of claim 34, wherein the one or more ground electrodes are offset axially from the primary electrode.

66. The method of claim 34, wherein the concentration of fuel proximate a periphery of the prechamber volume is higher than the average fuel concentration in the fuel-air mixture.

67. The method of claim 34, wherein the concentration of fuel is higher proximate the one or more holes than the average fuel concentration in the fuel-air mixture.

68. The method of claim 34, wherein the concentration of fuel proximate the one or more electrode gaps is lower than the average fuel concentration in the fuel-air mixture to increase ignition delay.

* * * * *